US012563575B2

(12) United States Patent
Takahashi et al.

(10) Patent No.: US 12,563,575 B2
(45) Date of Patent: Feb. 24, 2026

(54) TERMINAL, BASE STATION, AND WIRELESS COMMUNICATION METHOD FOR DOWNLINK CONTROL CHANNEL REPETITION

(71) Applicants: DENSO CORPORATION, Kariya (JP); TOYOTA JIDOSHA KABUSHIKI KAISHA, Toyota (JP)

(72) Inventors: Hideaki Takahashi, Kariya (JP); Haruhiko Sogabe, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 314 days.

(21) Appl. No.: 18/352,076

(22) Filed: Jul. 13, 2023

(65) Prior Publication Data

US 2023/0362956 A1      Nov. 9, 2023

Related U.S. Application Data

(63) Continuation of application No. PCT/JP2022/001015, filed on Jan. 14, 2022.

(30) Foreign Application Priority Data

Jan. 14, 2021      (JP) ................................. 2021-004108

(51) Int. Cl.
*H04W 72/23* (2023.01)
*H04W 72/0446* (2023.01)
*H04W 72/232* (2023.01)

(52) U.S. Cl.
CPC ..... *H04W 72/232* (2023.01); *H04W 72/0446* (2013.01)

(58) Field of Classification Search
CPC ........... H04W 72/232; H04W 72/0446; H04W 72/1273; H04W 72/1289; H04W 72/23;
(Continued)

(56) References Cited

U.S. PATENT DOCUMENTS

2015/0208392 A1*  7/2015  Park ...................... H04W 72/23
                                                                370/329
2019/0174466 A1*  6/2019  Zhang ................... H04L 5/0057
(Continued)

FOREIGN PATENT DOCUMENTS

EP          3637669 A1      4/2020
WO     WO-2020121413 A1     6/2020
WO     WO-2020261510 A1    12/2020

OTHER PUBLICATIONS

"On PDCCH enhancements for URLLC," ZTE, 3GPP TSG RAN WG1 Ad-Hoc Meeting 1901, R1-1900069, dated Jan. 12, 2019.
(Continued)

*Primary Examiner* — Wei Zhao
(74) *Attorney, Agent, or Firm* — Harness, Dickey & Pierce, P.L.C.

(57) ABSTRACT

A terminal includes a receiving unit that receives search space information on a search space associated with a control resource set and a control unit which controls monitoring of a downlink control channel using the search space in a given-cycle duration based on the search space information, wherein, based on repetition information related to repetition of the downlink control channel included in the search space information, the control unit controls monitoring of the downlink control channel repeatedly transmitted between different slots and/or in the same slot in the duration.

12 Claims, 29 Drawing Sheets

(58) Field of Classification Search
CPC ...... H04W 72/004; H04L 5/0064; H04L 1/08;
H04L 5/006
See application file for complete search history.

(56) References Cited

U.S. PATENT DOCUMENTS

| | | | |
|---|---|---|---|
| 2020/0413412 A1 | 12/2020 | Kim et al. | |
| 2022/0038210 A1* | 2/2022 | Liu ........................... | H04L 1/08 |
| 2022/0070909 A1 | 3/2022 | Takeda et al. | |
| 2022/0248424 A1 | 8/2022 | Yoshioka et al. | |

OTHER PUBLICATIONS

MediaTek Inc. "Enhancements on Multi-TRP for PDCCH, PUSCH and PUCCH" , 3GPP TSG RAN WG1 #102-e R1-2005621, Aug. 2020 (7 pages).
3GPP TS 38.300 V15.9.0 (Mar. 2020).
Xiaomi, Discussion on the PDCCH repetition for NR URLLC[online], 3GPP TSG RAN WGI #94b R1-1811401, Sep. 2, 2018 Section 2.

* cited by examiner

Figure 5:
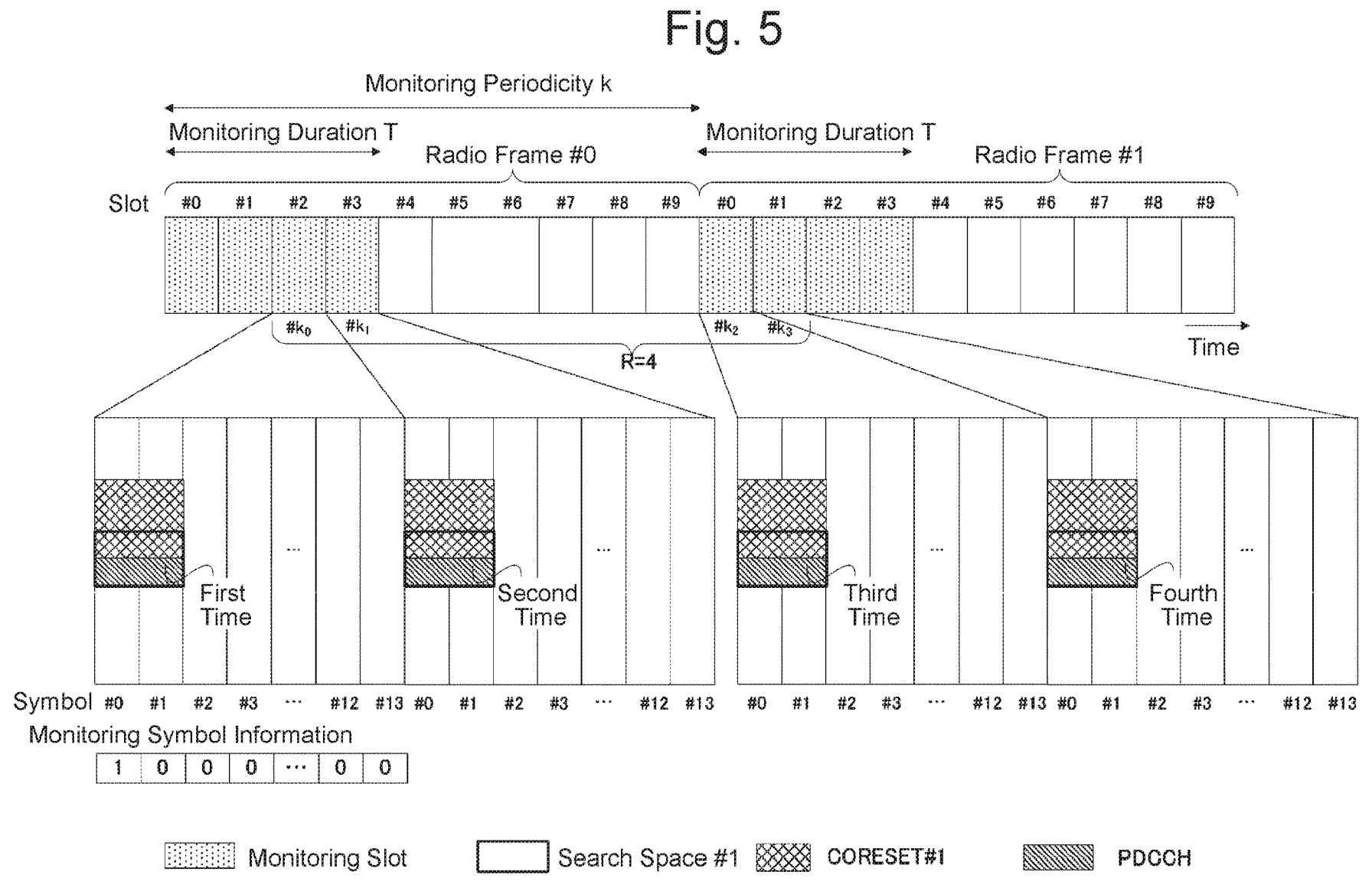

SearchSpace information element

```
-- ASN1START
-- TAG-SEARCHSPACE-START

SearchSpace ::=             SEQUENCE {
    searchSpaceId                SearchSpaceId,
    controlResourceSetId         ControlResourceSetId                        OPTIONAL,  -- Cond SetupOnly
    monitoringSlotPeriodicityAndOffset  CHOICE {
        sll                          NULL,
        sl2                          INTEGER (0..1),
        ...
        sl2560                       INTEGER (0..2559)
    }
    duration                     INTEGER (2..2559)                           OPTIONAL,  -- Cond Setup
    monitoringSymbolsWithinSlot  BIT STRING (SIZE (14))                      OPTIONAL,  -- Need R
    nrofCandidates               SEQUENCE {                                  OPTIONAL,  -- Cond Setup
        aggregationLevel1            ENUMERATED {n0, n1, n2, n3, n4, n5, n6, n8},
        aggregationLevel2            ENUMERATED {n0, n1, n2, n3, n4, n5, n6, n8},
        aggregationLevel4            ENUMERATED {n0, n1, n2, n3, n4, n5, n6, n8},
        aggregationLevel8            ENUMERATED {n0, n1, n2, n3, n4, n5, n6, n8},
        aggregationLevel16           ENUMERATED {n0, n1, n2, n3, n4, n5, n6, n8}
    }
    ...
}

SearchSpaceExt-v17xy ::=    SEQUENCE {
    numRepetition-r17            ENUMERATED {r1, r2, r4, r8, r16, r32, r64, r128, r256}  OPTIONAL,  -- Need R
    repetitionSymbolsWithinSlot-r17  BIT STRING (SIZE (14))                      OPTIONAL   -- Need R
}
...

-- TAG-SEARCHSPACE-STOP
-- ASN1STOP
```

Fig. 10

| Given Field Value in DCI | Repetition Number R |
|---|---|
| 00 | r1 |
| 01 | r2 |
| 10 | r3 |
| 11 | r4 |

| rep_max | r1 | r2 | r3 | r4 |
|---|---|---|---|---|
| 1 | 1 | - | - | - |
| 2 | 1 | 2 | - | - |
| 4 | 1 | 2 | 4 | - |
| >=8 | rep_max/8 | rep_max/4 | rep_max/2 | rep_max/1 |

*ControlResourceSet information element*

```
-- ASN1START
-- TAG-CONTROLRESOURCESET-START

ControlResourceSet ::=          SEQUENCE {
    controlResourceSetId            ControlResourceSetId,
    frequencyDomainResources        BIT STRING (SIZE (45)),
    duration                        INTEGER (1..maxCoResetDuration),
    cce-REG-MappingType             CHOICE {
        interleaved                     SEQUENCE {
            reg-BundleSize                  ENUMERATED {n2, n3, n6},
            interleaverSize                 ENUMERATED {n2, n3, n6},
            shiftIndex                      INTEGER(0..maxNrofPhysicalResourceBlocks-1)    OPTIONAL -- Need S
        },
        nonInterleaved                  NULL
    },
    ....,
    [[
    frequencyDomainResourcesRepetition-r17    SEQUENCE (SIZE (1..maxNrofRepetition-r17)) OF BIT STRING (size (45))
    ]]
}

-- TAG-CONTROLRESOURCESET-STOP
-- ASN1STOP
```

-- ASN1START
-- TAG-CONTROLRESOURCESET-START

ControlResourceSet information element

ControlResourceSet ::=          SEQUENCE {
    controlResourceSetId            ControlResourceSetId,
    frequencyDomainResources        BIT STRING (SIZE (45)),
    duration                        INTEGER (1..maxCoReSetDuration),
    cce-REG-MappingType             CHOICE {
        interleaved                     SEQUENCE {
            reg-BundleSize                  ENUMERATED {n2, n3, n6},
            interleaverSize                 ENUMERATED {n2, n3, n6},
            shiftIndex                      INTEGER(0..maxNrofPhysicalResourceBlocks-1)    OPTIONAL -- Need S
        },
        nonInterleaved                  NULL
    },
    ...,
    [[
    numRepetition-r17               ENUMERATED {r1, r2, r4, r8, r16, r32}    OPTIONAL    -- Need R
    ]]
}

-- TAG-CONTROLRESOURCESET-STOP
-- ASN1STOP
```

Fig. 16

ControlResourceSet information element

```
TS38.331

-- ASN1START
-- TAG-CONTROLRESOURCESET-START

ControlResourceSet ::=          SEQUENCE {
    controlResourceSetId            ControlResourceSetId,
    frequencyDomainResources        BIT STRING (SIZE (45)),
    duration                        INTEGER (1..maxCoReSetDuration),
    cce-REG-MappingType             CHOICE {
        interleaved                     SEQUENCE {
            reg-BundleSize                  ENUMERATED {n2, n3, n6},
            interleaverSize                 ENUMERATED {n2, n3, n6},
            shiftIndex                      INTEGER (0..maxNrofPhysicalResourceBlocks-1)    OPTIONAL -- Need S
        },
        nonInterleaved                  NULL
    },
    ....,
    [[
    numRepetition-r17               ENUMERATED {r1, r2, r4, r8, r16, r32}                           OPTIONAL  -- Need R
    rbg-ShiftList-r17               SEQUENCE (SIZE (1..maxRep-r17)) OF RBG-Shift-r17                OPTIONAL  -- Need R
    ]]
}

RBG-Shift-r17 ::=               INTEGER (1..32)

}

-- TAG-CONTROLRESOURCESET-STOP
-- ASN1STOP
```

Fig. 19

SearchSpace information element

```
TS38.331

-- ASN1START
-- TAG-SEARCHSPACE-START

SearchSpace ::=                      SEQUENCE {
    searchSpaceId                        SearchSpaceId,
    controlResourceSetId                 ControlResourceSetId                 OPTIONAL,   -- Cond SetupOnly
    monitoringSlotPeriodicityAndOffset   CHOICE {
        sl1                                  NULL,
        sl2                                  INTEGER (0..1),
        ...
        sl2560                               INTEGER (0..2559)
    }
    duration                             INTEGER (2..2559)                    OPTIONAL,   -- Cond Setup
    monitoringSymbolsWithinSlot          BIT STRING (SIZE (14))               OPTIONAL,   -- Need R
    nrofCandidates                       SEQUENCE {                           OPTIONAL,   -- Cond Setup
        aggregationLevel1                    ENUMERATED {n0, n1, n2, n3, n4, n5, n6, n8},
        aggregationLevel2                    ENUMERATED {n0, n1, n2, n3, n4, n5, n6, n8},
        aggregationLevel4                    ENUMERATED {n0, n1, n2, n3, n4, n5, n6, n8},
        aggregationLevel8                    ENUMERATED {n0, n1, n2, n3, n4, n5, n6, n8},
        aggregationLevel16                   ENUMERATED {n0, n1, n2, n3, n4, n5, n6, n8}
    }
    ...
} searchSpaceExt-v17xy ::=
    controlResourceSetRepetition-r17     SEQUENCE {                           OPTIONAL,   -- Cond Setup
                                                                              OPTIONAL    -- Cond Setup2
        controlResourceSetId                 SEQUENCE (SIZE (1..maxRep-17)) OF ControlResourceSetId   OPTIONAL   -- Need R
    }
    ...

-- TAG-SEARCHSPACE-STOP
-- ASN1STOP
```

PDCCH-Config information element

```
-- ASN1START
-- TAG-PDCCH-CONFIG-START

PDCCH-Config ::=                                SEQUENCE (
    controlResourceSetToAddModList              SEQUENCE(SIZE (1..3)) OF ControlResourceSet        OPTIONAL,    -- Need N
    controlResourceSetToReleaseList             SEQUENCE(SIZE (1..3)) OF ControlResourceSetId      OPTIONAL,    -- Need N
    searchSpacesToAddModList                    SEQUENCE(SIZE (1..10)) OF SearchSpace              OPTIONAL,    -- Need N
    searchSpacesToReleaseList                   SEQUENCE(SIZE (1..10)) OF SearchSpaceId            OPTIONAL,    -- Need N
    ...,
    [[
    repetitionControlResourceSetToAddModList-r17   SEQUENCE (SIZE (1..maxRep-r17)) OF ControlResourceSet     OPTIONAL,   -- Need N
    repetitionControlResourceSetToReleaseList-r17  SEQUENCE (SIZE (1..maxRep-r17)) OF ControlResourceSetId   OPTIONAL,   -- Need N
    ]]
}
...

-- TAG-PDCCH-CONFIG-STOP
-- ASN1STOP
```

PDCCH-ConfigCommon information element

```
-- ASN1START
-- TAG-PDCCH-CONFIGCOMMON-START

PDCCH-ConfigCommon ::=                          SEQUENCE (
    controlResourceSetZero                      ControlResourceSetZero                 OPTIONAL,    -- Cond InitialBWP-Only
    commonControlResourceSet                    ControlResourceSet                     OPTIONAL,    -- Need R
    searchSpaceZero                             SearchSpaceZero                        OPTIONAL,    -- Cond InitialBWP-Only
    commonSearchSpaceList                       SEQUENCE (SIZE(1..4)) OF SearchSpace   OPTIONAL,    -- Need R
    searchSpaceSIB1                             SearchSpaceId                          OPTIONAL,    -- Need S
    searchSpaceOtherSystemInformation           SearchSpaceId                          OPTIONAL,    -- Need S
    pagingSearchSpace                           SearchSpaceId                          OPTIONAL,    -- Need S
    ra-SearchSpace                              SearchSpaceId                          OPTIONAL,    -- Need S
    ...,
    [[
    repetitionControlResourceSet-r17    SEQUENCE (SIZE (1..maxRep-r17)) OF ControlResourceSet     OPTIONAL,   -- Need R
    ]]
}

-- TAG-PDCCH-CONFIGCOMMON-STOP
-- ASN1STOP
```

Fig. 23

DCI Format 1_X or 0_X

| Resource Allocation Field | Search Space Group Switching Field |
|---|---|

DCI Format 2_X

| | Search Space Group Switching Field #1 | ... | Search Space Group Switching Field #M | |
|---|---|---|---|---|

Fig. 24

| Value of Search Space Group Switching Field in DCI | Repetition Number R | Search Space Group |
|---|---|---|
| 00 | r1 | First Search Space Group Configured by Upper Layer |
| 01 | r2 | Second Search Space Group Configured by Upper Layer |
| 10 | r3 | Third Search Space Group Configured by Upper Layer |
| 11 | r4 | Fourth Search Space Group Configured by Upper Layer |

| rep_max | r1 | r2 | r3 | r4 |
|---|---|---|---|---|
| 1 | 1 | - | - | - |
| 2 | 1 | 2 | - | - |
| 4 | 1 | 2 | 4 | - |
| >=8 | rep_max/8 | rep_max/4 | rep_max/2 | rep_max/1 |

TERMINAL, BASE STATION, AND WIRELESS COMMUNICATION METHOD FOR DOWNLINK CONTROL CHANNEL REPETITION

CROSS-REFERENCE TO RELATED APPLICATIONS

This application is a continuation application of International Patent Application No. PCT/JP2022/001015, filed Jan. 14, 2022, which designated the U.S. and claims the benefit of and priority from Japanese Patent Application No. 2021-004108, filed on Jan. 14, 2021. The entire disclosures of the above applications are incorporated herein by reference.

TECHNICAL FIELD

This disclosure relates to a terminal, a base station, and a wireless communication method.

BACKGROUND

In the 3rd Generation Partnership Project (3GPP) as an international standards organization, New Radio (NR) Release 15 as the 5th generation (5G) RAT (Radio Access Technology) is specified as a successor to Long Term Evolution (LTE) as the 3.9th generation RAT and LTE-Advanced as the 4th generation RAT, for example, Non-Patent Document 1: 3GPP TS 38.300 V15.9.0 (2020-03).

In Release 15, a control resource set (CORESET) is provided in at least part of a band available for a terminal (for example, user equipment (UE)) to improve frequency utilization efficiency compared to LTE in which a control area is provided across the entire band available for the terminal.

SUMMARY

In the 3GPP, the consideration of functions on the assumption of a terminal for Internet of Things (IoT) performing radio access using NR is started so far. It is assumed that a bandwidth available for the IoT terminal is narrowed down compared to a terminal introduced in Release 15. In order to complement a reduced coverage caused by such a narrower bandwidth, it is also considered to transmit a downlink control channel repeatedly.

It is an object of this disclosure to provide a terminal, a base station, and a wireless communication method capable of properly controlling monitoring of a downlink control channel repeatedly transmitted.

A terminal according to one aspect of this disclosure includes: a receiving unit which receives search space information on a search space associated with a control resource set; and a control unit which controls monitoring of a downlink control channel using the search space in a given-cycle duration based on the search space information, wherein, based on repetition information related to repetition of the downlink control channel included in the search space information, the control unit may control monitoring of the downlink control channel repeatedly transmitted between different slots and/or in the same slot in the duration.

According to the one aspect of this disclosure, monitoring of a downlink control channel repeatedly transmitted can be controlled properly.

BRIEF DESCRIPTION OF DRAWINGS

FIG. 5 is a diagram illustrating a second example of inter-slot repetition according to the present embodiment.

FIG. 9 is a diagram illustrating an example of search space information according to the present embodiment.

FIG. 10 is a diagram illustrating an example of derivation of a repetition number according to the present embodiment.

FIG. 12 is a diagram illustrating a first example of CORESET information according to the present embodiment.

FIG. 14 is a diagram illustrating a second example of CORESET information according to the present embodiment.

FIG. 16 is a diagram illustrating a third example of CORESET information according to the present embodiment.

FIG. 19 is a diagram illustrating an example of search space information according to the present embodiment.

FIG. 20 is a diagram illustrating an example of PDCCH information according to the present embodiment.

FIG. 23 is a diagram illustrating an example of DCI used for switching control of search space groups according to the present embodiment.

FIG. 24 is a diagram illustrating an example of values of search group switching fields according to the present embodiment.

DETAILED DESCRIPTION

Figure 1:
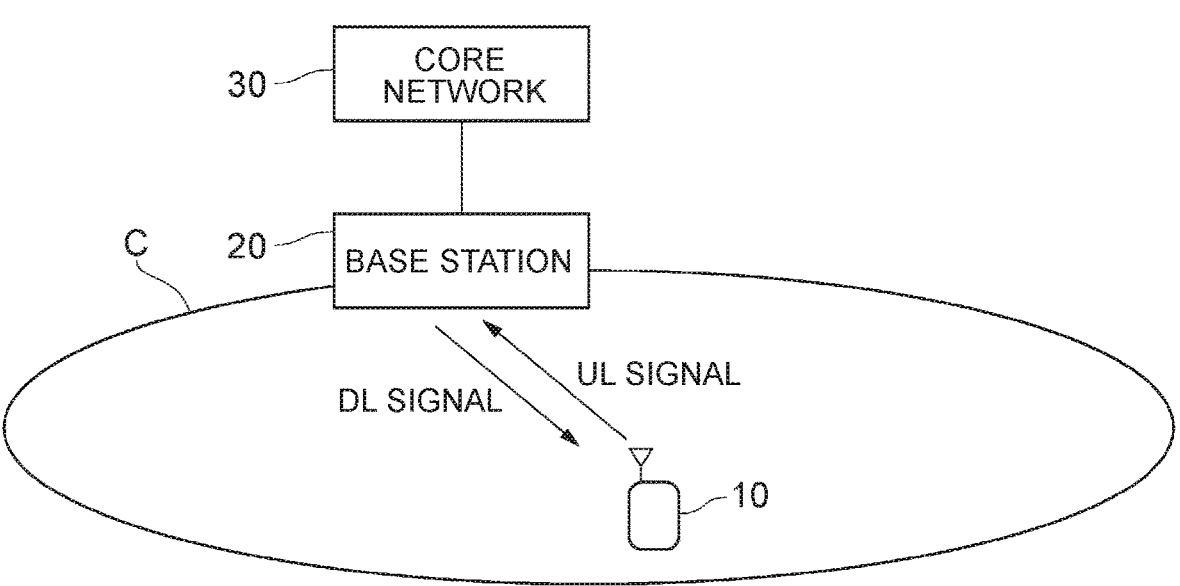
FIG. 1 is a diagram illustrating an example of the overview of a wireless communication system according to the present embodiment.

An embodiment of this disclosure will be described with reference to the accompanying drawings. Note that components to which the same reference numerals are given in respective drawings may have the same or similar configurations.

FIG. 1 is a diagram illustrating an example of the overview of a wireless communication system according to the present embodiment. As illustrated in FIG. 1, a wireless communication system 1 may include a terminal 10, a base station 20, and a core network 30. Note that the number of terminals 10 and base stations 20 illustrated in FIG. 1 is just an illustrative example, and the number is not limited to that illustrated.

As Radio Access Technology (RAT) of the wireless communication system 1, for example, NR is assumed, but it is not limited to NR, and various RATs can be utilized, such as the 6th generation (6G) RAT and later.

The terminal 10 is a given terminal or equipment such as a smartphone, a personal computer, an in-vehicle terminal, an in-vehicle device, a stationary device, or a telematics control unit (TCU). The terminal 10 may also be called user equipment (UE), a mobile station (MS), a terminal (User Terminal), a radio apparatus, a subscriber terminal, an access terminal, or the like. The terminal 10 may be of a mobile type or a fixed type. The terminal 10 is configured communicably using NR as RAT.

The base station 20 forms one or more cells C to communicate with the terminal 10 using each of the cells C. The cell C may also be mutually rephrased as a serving cell, a carrier, a component carrier (CC), and the like. The base station 20 may also be called a gNodeB (gNB), an en-gNB, a Next Generation-Radio Access Network (NG-RAN) node, a low-power node, a Central Unit (CU), a Distributed Unit (DU), a gNB-DU, a Remote Radio Head (RRH), or an Integrated Access and Backhaul/Backhauling (IAB) node. The base station 20 is not limited to one node, and it may be composed of plural nodes (for example, a combination of a lower node such as a DU and an upper node such as a CU).

The core network 30 is, for example, an NR-compatible core network (5G Core Network: 5GC), but the core network 30 is not limited thereto. A device on the core network 30 (hereinafter, which may also be called a "core network device") performs mobility management such as paging and location registration of the terminal 10. The core network device may be connected to the base station 20 through a given interface (for example, S1 or NG interface).

The core network device may also include at least one of functions such as AMF (Access and Mobility Management Function) for managing C-plane information (for example, information related to access and mobility management), and UPF (User Plane Function) for transmission control of U plane information (for example, user data).

In the wireless communication system 1, the terminal 10 receives a downlink (DL) signal from the base station 20 and/or transmits an uplink (UL) signal. In the terminal 10, one or more carriers may be configured. The bandwidth of each carrier is, for example, in a range of 5 MHz to 400 MHz. One or more bandwidth parts (BWPs) may be configured on one carrier. One BWP has at least part of the bandwidth of the carrier.

One or more control resource sets (CORESETs) may be set in one BWP. Each CORESET may be configured in one BWP. The CORESET is a resource in a time domain and a frequency domain used for transmission of a downlink control channel. For example, the CORESET is composed of a given number of symbols (for example, one to three symbols) and a given number of resource blocks (RBs) (for example, 6n (n≥1) RBs).

In the following, a physical downlink control channel (PDCCH) will be described as an example of a downlink control channel, but the downlink control channel needs only to be a channel used for transmission of downlink control information (DCI), and the name is not limited to the PDCCH.

The CORESET includes plural control channel elements (CCEs). One CCE is composed of a given number of resource element groups (REGs). For example, one REG may be composed of one RB (that is, one symbol and 12 subcarriers), and one CCE may be composed of six REGs (that is, six RBs).

Each of candidate resources in which the PDCCH is placed (hereinafter called "PDCCH candidates") is composed of a given number of CCEs according to the aggregation level (AL). For example, when AL=1, one PDCCH candidate is composed of one CCE, while when AL=2, one PDCCH candidate is composed of two CCEs.

A search space includes each PDCCH candidate composed of one or more CCEs in the CORESET associated with the search space. Therefore, it can be said that the search space is composed of at least part of the CORESET associated with the search space. The terminal 10 monitors each PDCCH candidate included in the search space to detect the DCI.

Here, monitoring of each PDCCH candidate in the search space means decoding the DCI according to a given format, which is called "blind decoding." Further, as the search space, a common search space (CSS) as a common search space of one or more terminals 10, and a UE-specific search space (USS) as a search space specific to the terminal 10 may also be included. The search space described above may be provided for each AL, and one or more AL search space sets may be called a search space set. The term "search space" in this specification may also be a specific AL search space, or a search space set.

Information on each CORESET (hereinafter called "CORESET information") is given from the base station 20 to the terminal 10. For example, the CORESET information may also indicate "ControlResourceSet," for example, including information items (Information Elements: IEs) for radio resource control (RRC). Here, IEs may also be rephrased as parameters. For example, the CORESET information may include at least one of the following:

CORESET identification information (for example, RRC IE "control ResourceSetId"), Duration information indicative of a CORESET duration (for example, RRC IE "duration"), and Frequency domain resource information indicative of each of frequency domain resources that configure the CORESET (for example, RRC IE "frequencyDomain-Resources").

Further, information on each space (hereinafter called "search space information") is given from the base station 20 to the terminal 10. For example, the search space information may be RRC IE "SearchSpace." For example, the search space information may include at least one of the following:

Search space identification information (for example, RRC IE "searchSpaceId"),

CORESET identification information associated with the search space (for example, RRC IE "controlResource-SetId"), Periodicity/offset information indicative of a cycle k and an offset o for monitoring the PDCCH (for example, RRC IE "monitoringSlotPeriodicityAndOffset"), where the periodicity k and the offset o are called a monitoring periodicity k and a monitoring offset o respectively below, Monitoring duration information (for example, RRC IE "duration") indicative of a duration T for monitoring the PDCCH, where the duration T is called a monitoring duration T below, Monitoring symbol information (for example, RRC IE "monitoringSymbolsWithinSlot") indicative of the first symbol for monitoring the PDCCH in a slot, and Search space group information (for example, RRC IE "searchSpaceGroupIdList") indicative of one or more groups associated with the search space (hereinafter "search space group(s)").

Figure 2:
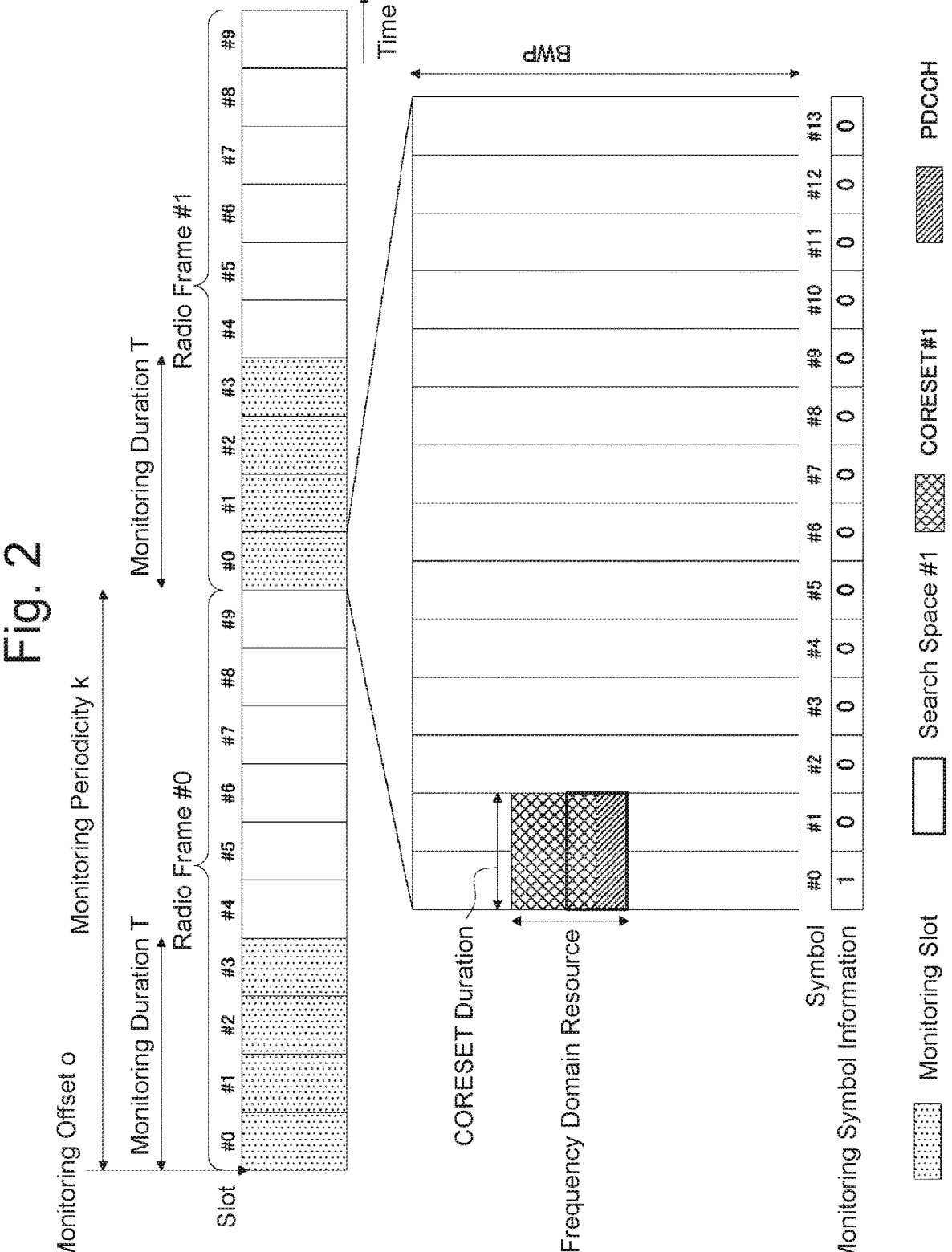
FIG. 2 is a diagram illustrating an example of PDCCH monitoring in NR.

The terminal 10 controls PDCCH monitoring based on the CORESET information and the search space information mentioned above. FIG. 2 is a diagram illustrating an example of PDCCH monitoring in NR. For example, in FIG. 2, an example of PDCCH monitoring using a search space #1 associated with a CORESET #1 is illustrated.

In FIG. 2, for example, the monitoring periodicity k is 10 slots, and the monitoring duration T is four slots. Further, it is assumed that a CORESET duration for the CORESET #1 associated with the search space #1 is two symbols, and a frequency domain resource for the CORESET #1 is 6n (n≥1) RBs.

The terminal 10 determines a start slot of the monitoring duration based on a radio frame number $n_f$, a slot number $n_{s,f}$ in the radio frame #$n_f$, the number of slots $N_{s,f}$ in the radio frame, the monitoring periodicity k, and the monitoring offset o. For example, the terminal 10 determines a slot (slot #0 in FIG. 2) with a slot number that satisfies Formula 1 below to be the start slot of the monitoring duration.

$$(n_f N_{s,f} + n_{s,f} - o) \bmod k = 0 \qquad \text{Formula 1}$$

Note that FIG. 2 is just illustrative example, and the radio frame number $n_f$, the slot number $n_{s,f}$ in the radio frame #$n_f$, the number of slots $N_{s,f}$ in the radio frame, the monitoring periodicity k, the monitoring offset o, and the like are not limited to those illustrated. For example, in FIG. 2 or later, since examples in which subcarrier spacing (SCS) is 15 kHz are illustrated, the number of slots $N_{s,f}$=10 in the radio frame, but it is not limited thereto. When SCS larger than 15 kHz (for example, 30 kHz, 60 kHz, 120 kHz, or the like) is used, the number of slots $N_{s,f}$ in the radio frame increases.

Further, a bit of the monitoring symbol information corresponding to a symbol #0 among bits respectively corresponding to symbols #0 to #13 indicated in FIG. 2 is "1." Therefore, the CORESET #1 associated with the search space #1 is placed in two symbols in each slot (hereinafter "monitoring slot") within the monitoring duration using the symbol #0 as the start position. As mentioned above, the search space #1 is at least part of the CORESET #1 associated with the search space #1.

The terminal 10 monitors each of PDCCH candidates in the search space #1 by using, as monitoring slots, T slots continuous from the start slot #0 determined as mentioned above. The terminal 10 monitors each of the PDCCH candidates in the search space #1 to detect the PDCCH for the terminal 10. The detection of the PDCCH may also be rephrased as detection of DCI in a given format with a cyclic redundancy check (CRC) scrambled by a given radio network temporary identifier (RNTI).

Note that in the DCI format, a DCI format (for example, DCI format 1_X) used for scheduling of a downlink shared channel(s), a DCI format (for example, DCI format 0_X) used for scheduling of an uplink shared channel(s), and a DCI format (for example, DCI format 2_X) used for any other purpose different from scheduling may also be included. Here, X is a positive integer.

Figure 3:
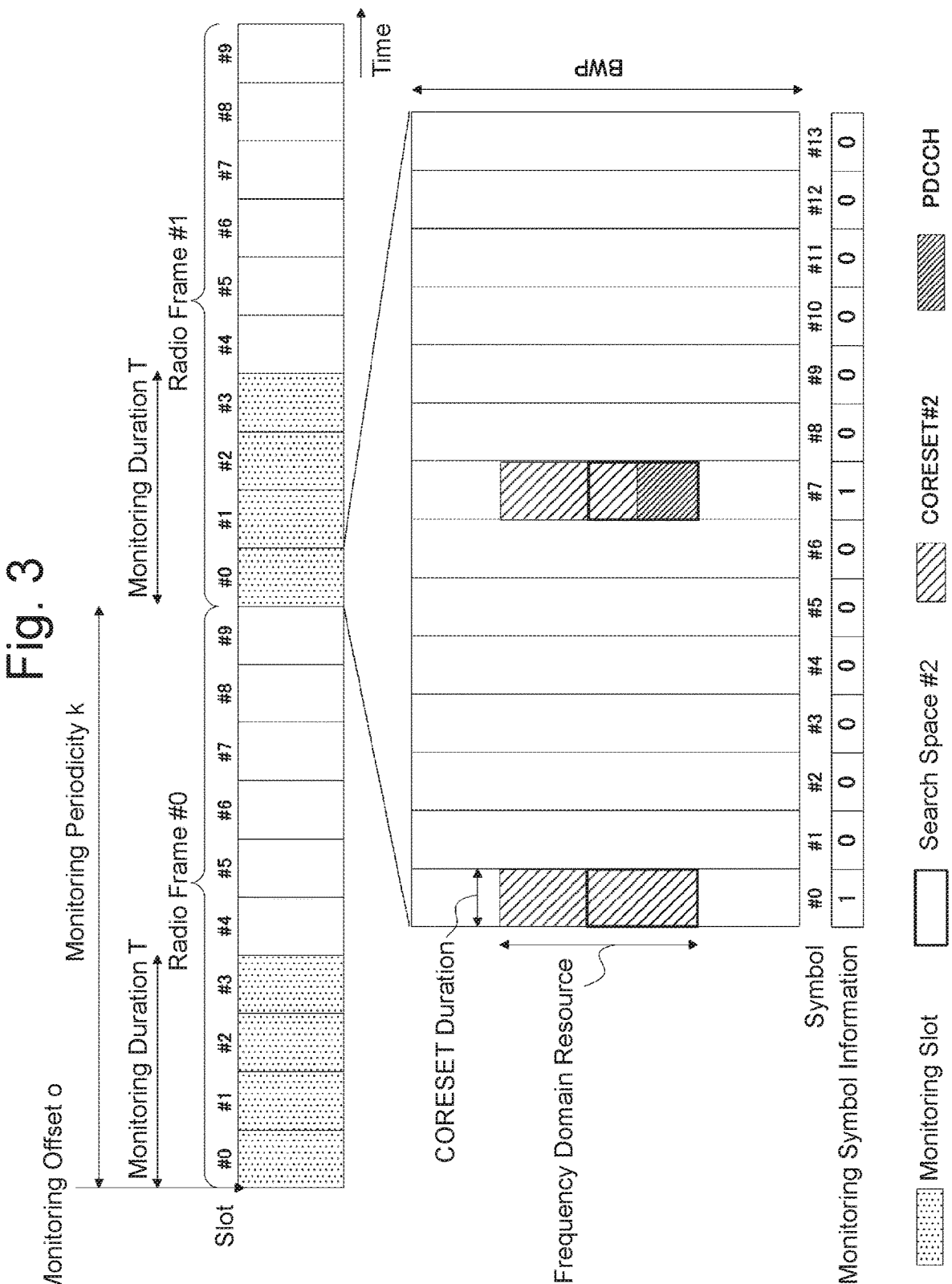
FIG. 3 is a diagram illustrating another example of PDCCH monitoring in NR.

FIG. 3 is a diagram illustrating another example of PDCCH monitoring in NR. For example, an example of PDCCH monitoring using a search space #2 associated with a CORESET #2 is illustrated in FIG. 3. FIG. 3 is different from FIG. 2, in which the single search space is configured, in that plural search spaces are configured in each slot within the monitoring duration. FIG. 3 will be described by mainly focusing on differences from FIG. 2.

In FIG. 3, a CORESET duration for the CORESET #2 is one symbol. A bit of the monitoring symbol information corresponding to a symbol #0 and a symbol #7 among bits respectively corresponding to symbols #0 to #13 is "1." Therefore, the CORESET #2 associated with the search space #2 is placed in one symbol in each slot within the monitoring duration using the symbol #0 and the symbol #7 as respective start positions.

The terminal 10 monitors respective PDCCH candidates in respective search spaces #2 of the symbol #0 and the symbol #7 in each slot within the monitoring duration. In FIG. 3, the terminal 10 does not detect the PDCCH in the search space #2 of the symbol #0, but detects the PDCCH in the search space #2 of the symbol #7.

Thus, in NR, the terminal 10 monitors a PDCCH in a monitoring duration configured by a given periodicity. Further, one or more search spaces can be configured in each slot within the monitoring duration, and the terminal 10 may also monitor one or more search spaces in each slot.

In the meantime, in NR Release 17, support of functions for a terminal on the assumption of being lower performance and price range than a terminal for enhanced Mobile Broadband (eMBB) or Ultra-reliable and Low Latency Communications (URLLC) introduced in Release 15 or 16 is being considered. Such a terminal is also called a reduced capability (RedCap) terminal or device, which may also be utilized, for example, in an industrial wireless sensor, a surveillance camera (video surveillance), or a wearable device.

The RedCap terminal is assumed to have higher performance than a terminal for low power wide area (LPWA) communication, and a carrier used by the RedCap terminal may have a bandwidth of 20 MHz, 50 MHz, or 100 MHz, for example. Note, for example, that there are Long Term Evolution for Machine-type-communication (LTE-M) working with LTE-type RAT in Category 1, Narrow Band IoT (NB-IoT), and the like as LPWAs. The maximum bandwidth for Category 1 is 20 MHz, the maximum bandwidth for LTE-M is 1.4 MHz (6 RB), and the maximum bandwidth for NB-IoT is 180 kHz (1 RB). Thus, the RedCap terminal may be used as a middle-range terminal between use for eMBB or URLLC and use for LPWA.

When the RedCap terminal is assumed as the terminal 10, it is considered to transmit the PDCCH repeatedly to complement a reduced coverage caused by a narrower bandwidth of the carrier. Specifically, it is assumed that the base station 20 repeatedly transmits the PDCCH in a time domain and/or a frequency domain.

However, the terminal 10 performs PDCCH reception processing (for example, demodulation, decoding, and the like) on the assumption that the first-transmitted PDCCH is transmitted in each search space configured in a given-cycle monitoring duration. Therefore, in an existing monitoring method, when the PDCCH is repeatedly transmitted, the terminal 10 may not be able to properly monitor the PDCCH repeatedly transmitted.

Therefore, in the present embodiment, (1) PDCCH monitoring (hereinafter called "first PDCCH monitoring") in which the PDCCH is repeatedly transmitted using different time domain resources, (2) PDCCH monitoring (hereinafter called "second PDCCH monitoring") in which the PDCCH is repeatedly transmitted using different frequency domain resources, and (3) a combination of first PDCCH monitoring and second PDCCH monitoring will be described. Further, in the present embodiment, (4) control related to switching of search space groups (hereinafter called "switching control") will be described.

(1) First PDCCH Monitoring

In the first PDCCH monitoring, PDCCH monitoring in which the PDCCH is repeatedly transmitted in time domains will be described. The terminal 10 performs control to monitor the PDCCH repeatedly transmitted using different time domain resources in a given-cycle monitoring duration T based on information (hereinafter called "repetition information") related to the repetition of the PDCCH included in search space information.

Here, for example, the different time domain resources may be different slots in the given-cycle monitoring duration T, or different symbols in the same slot within the monitoring duration T. Thus, the PDCCH may be repeated between different slots in one or more monitoring durations (hereinafter called "inter-slot repetition), or may be repeated in the same slot within the monitoring duration (hereinafter called "intra-slot repetition").

Further, the repetition information may also include information indicative of a PDCCH repetition number R, or may include information indicative of the maximum value of the repetition number R. In the latter case, the terminal 10 may determine the repetition number R based on the maximum value and a given field value in the DCI. Note that the repetition number R may also be called a repetition level or the like.

Further, the repetition information may include information indicative of the start slot of the PDCCH repetition (hereinafter called "start slot information"). Further, in the case of the intra-slot repetition, the repetition information may include information indicative of a symbol in which the PDCCH is repeated (hereinafter called "repetition symbol information").

Based on the repetition information described above, the terminal 10 may configure a search space used for monitoring the PDCCH repeatedly transmitted by inter-slot repetition and/or intra-slot repetition. The terminal 10 may also monitor PDCCH candidates in the configured search space to detect the PDCCH.

Thus, when the PDCCH is repeatedly transmitted, since the search space for monitoring the PDCCH is also repeatedly configured, the repetition of the PDCCH may be rephased as repetition of the search space. The search space concerned is also called a "repetitive search space."

(1.1) Inter-Slot Repetition

The inter-slot repetition may be applied to plural slots in one monitoring duration T among given-cycle monitoring durations T, or may be applied to plural slots that span across plural monitoring durations T among given-cycle monitoring durations T.

In the inter-slot repetition, monitoring slots #$k_i$ (i=0, . . . , R−1) in which the PDCCH is transmitted the first to R-th times in the given-cycle monitoring duration T are determined based on the repetition number R as the PDCCH repetition. Specifically, the terminal 10 may also determine the monitoring slots #$k_i$ (i=0, . . . , R−1) based on at least one of the repetition start slot #$k_0$, the radio frame number $n_f$, the slot number $n_{s,f}$ in the radio frame #$n_f$, the number of slots $N_{s,f}$ in the radio frame, the monitoring periodicity k, a monitoring section T, and the monitoring offset o in addition to the repetition number R. For example, the terminal 10 may also determine, as monitoring slots #$k_i$ (I=0, . . . , R−1), continuous slots started from $k_0$ to $k_{R-1}$ having slot numbers that satisfy Formula 2 below.

$$\lfloor n_f N_{s,f} + (k_i - o)/T \rfloor \bmod k = 0 \qquad \text{Formula 2}$$

Note that the repetition start slot #$k_0$ may also be notified from the base station 20 to the terminal 10 explicitly by the start slot information mentioned above. Alternatively, the start slot #$k_0$ may be derived by the terminal 10 itself based on implicit information without the explicit notification of the start slot information mentioned above. For example, the terminal 10 may also assume the start slot of the monitoring duration T as the repetition start slot #$k_0$.

Figure 4:
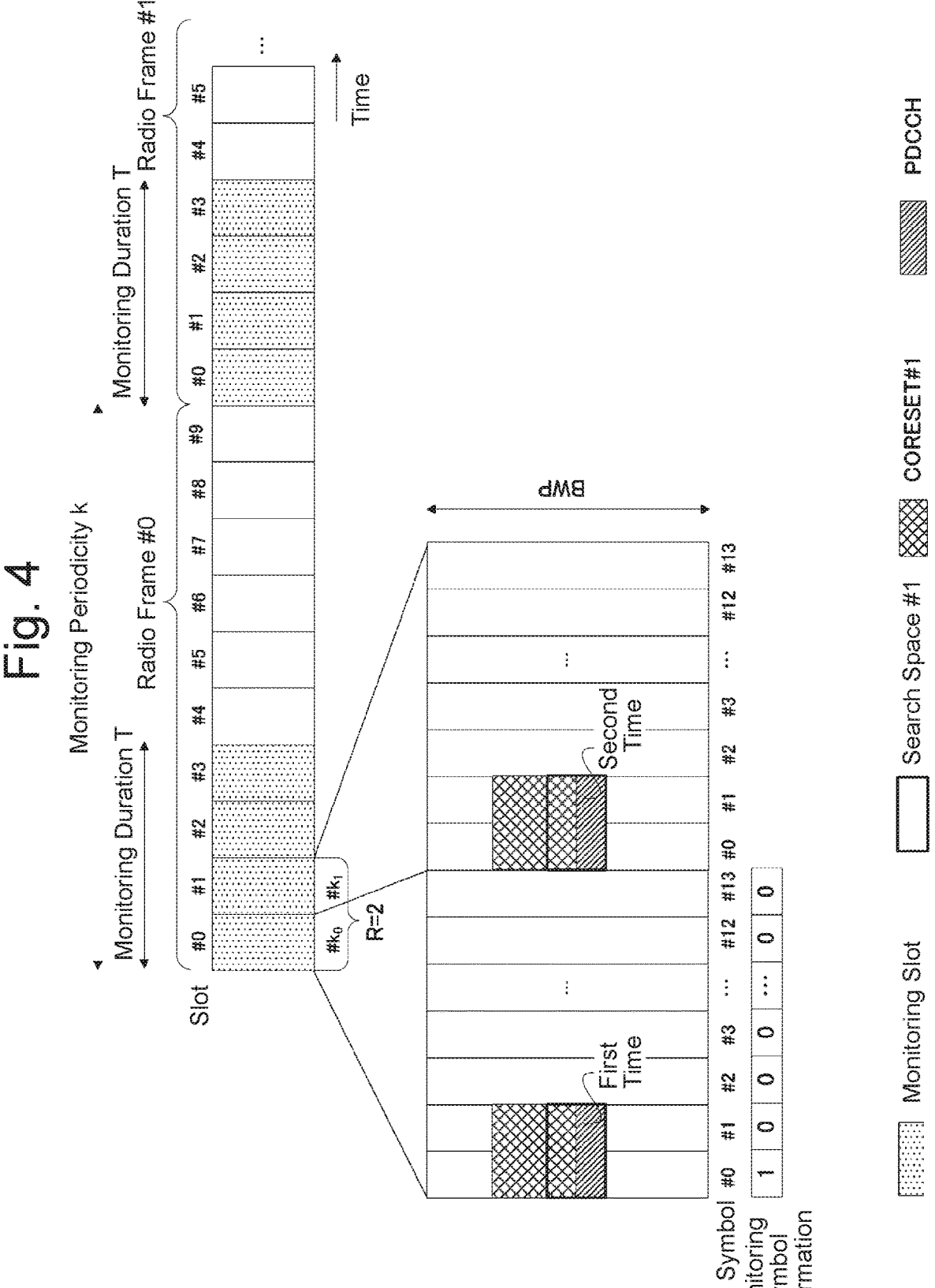
FIG. 4 is a diagram illustrating a first example of inter-slot repetition according to the present embodiment.

FIG. 4 is a diagram illustrating a first example of inter-slot repetition according to the present embodiment. As described with reference to FIG. 2, the monitoring duration T of the search space #1 is configured in slot #0 to slot #3 in each radio frame based on the search space information of the search space #1 in FIG. 4. Further, based on the CORESET information of the CORESET #1 associated with the search space #1, the CORESET #1 is placed in two symbols from a symbol #0 of each slot within the monitoring duration T. The search space #1 concerned is utilized as a repetitive search space.

For example, in FIG. 4, the PDCCH repetition number R is 2, and the repetition start slot #$k_0$ is identical to the start slot #0 of the given-cycle monitoring duration T. The terminal 10 assumes that the PDCCH of the repetition number R is transmitted in R slots continuous from the repetition start slot #$k_0$. In FIG. 4, since R=2, the terminal 10 monitors respective search space #1 of slot #$k_0$ and slot #$k_1$ on the assumption that the PDCCHs for the first time and the second time are mapped respectively in the respective search space #1 of slot #$k_0$ and slot #$k_1$.

For example, in FIG. 4, the terminal 10 detects the first-time PDCCH by monitoring the search space #1 of the slot #$k_0$, and detects the second-time PDCCH by monitoring the search space #1 of the slot #$k_1$. When decoding of the (i+1)th-time PDCCH is successful in the slot #$k_i$ (0≤i≤R−1), the terminal 10 may stop monitoring of the search space #1 in slot #$k_{i+1}$ or later, or may continue monitoring for the repetition number R. Further, the terminal 10 may combine the first-time PDCCH to the (i+1)th-time PDCCH to decode the (i+1)th-time PDCCH.

FIG. 5 is a diagram illustrating a second example of inter-slot repetition according to the present embodiment. Since the preconditions of FIG. 5 are the same as those in FIG. 4, FIG. 5 will be described by mainly focusing on differences from FIG. 4. In FIG. 5, the terminal 10 determines the repetition start slot #$k_0$ based on start slot information from the base station 20. For example, the start slot information may be the periodicity of the repetition start slot and an offset therefrom or an offset from the start slot of the monitoring duration T.

For example, in FIG. 5, it is assumed that the start slot information indicates an offset (2 here) from the start slot #0 of the monitoring duration T. Based on the start slot #0 of the monitoring duration T determined by Formula 1 mentioned above, and the offset "2" indicated by the start slot information, the terminal 10 determines the repetition start slot #$k_0$ in a slot #2. In FIG. 5, the repetition number is R=4, and a slot #3 with the search space #1 for the second-time PDCCH provided therein is the last slot of the monitoring duration T. Therefore, the search space #1 for the third-time and fourth-time PDCCHs is provided in slots #0 and #1 of the next monitoring duration T.

Thus, the terminal 10 counts up the slot number one by one from the repetition start slot #$k_0$ (here, slot #2 of the radio frame #0) to determine the monitoring slot #$k_i$ ($0 \leq I \leq R-1$), and when the monitoring slot #$k_{i+1}$ is a slot other than those in the monitoring duration T (here, a slot #4 of the radio frame #0), the terminal 10 may determine the monitoring slot #$k_{i+1}$ to be a start slot of the next monitoring duration (here, the slot #0 of the radio frame #1 after k-T slots of the slot #4 in the radio frame #0). The terminal 10 may repeat the above processing by counting up one by one until it becomes equal to the repetition number R−1. Thus, R monitoring slots #$k_0$ to #$k_{R-1}$ may span across plural monitoring durations.

Figure 6:
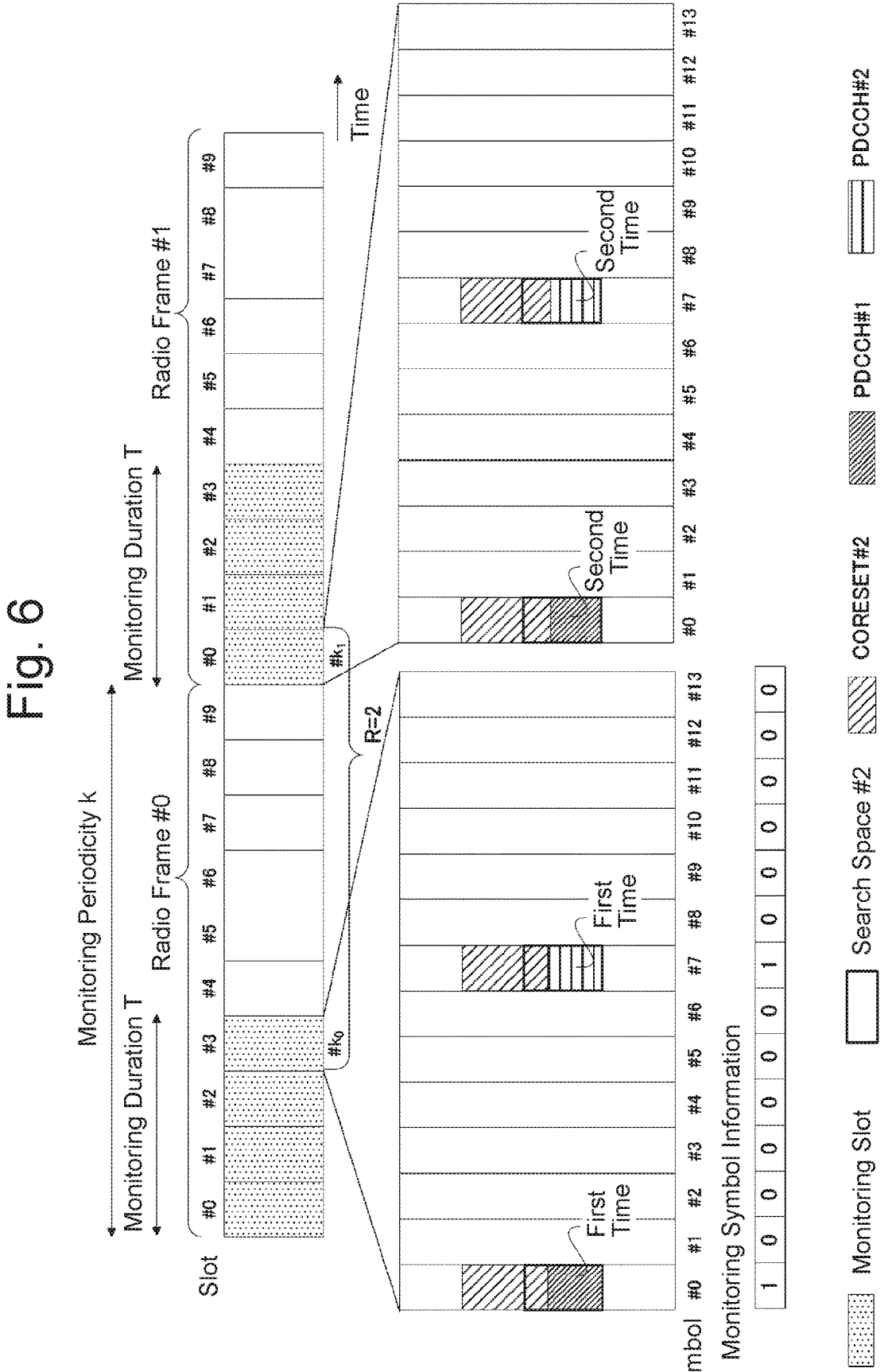
FIG. 6 is a diagram illustrating a third example of inter-slot repetition according to the present embodiment.

FIG. 6 is a diagram illustrating a third example of inter-slot repetition according to the present embodiment. As described with reference to FIG. 3, the monitoring duration T of the search space #2 is configured in slots #0 to #3 of each radio frame in FIG. 6 based on the search space information of the search space #2. Further, based on the CORESET information of the CORESET #2 associated with the search space #2, the CORESET #2 is placed in symbols #0 and #7 of each slot in the monitoring duration T. The search space #2 concerned is utilized as a repetitive search space.

FIG. 6 differs from FIG. 4 and FIG. 5 in that plural search spaces are provided in each repetition monitoring slot #$k_i$ (i=0, . . . , R−1), respectively. As illustrated in FIG. 6, different PDCCHs may be transmitted in the plural search spaces of each monitoring slot #$k_i$. Note that the different PDCCHs may also be PDCCHs for transmitting different pieces of DCI.

For example, in FIG. 6, the first-time PDCCH #1 is mapped in the search space #2 of the symbol #0 of a monitoring slot #$k_0$, and the first-time PDCCH #2 is mapped in the search space #2 of the symbol #7 of a monitoring slot #$k_1$. Further, the second-time PDCCH #1 is mapped in the search space #2 of the symbol #0 of the next monitoring slot #$k_1$, and the second-time PDCCH #2 is mapped in the search space #2 of the symbol #7 of the monitoring slot #$k_1$.

Thus, when plural search spaces are provided in each of R repetition monitoring slots #$k_i$ (I=0, . . . , R−1) in inter-slot repetition, plural PDCCHs can be repeated between the plural monitoring slots by mapping different PDCCHs in the plural search spaces, respectively.

(1.2) Intra-Slot Repetition

The intra-slot repetition may be applied to different symbols in the same slot of a given-cycle monitoring duration T. In the following, description will be made by mainly focusing on differences from (1.1) mentioned above.

For the intra-slot repetition, the base station 20 transmits, to the terminal 10, repetitive symbol information indicative of symbols with a PDCCH repeated in one slot (that is, in which the PDCCH for the second time and after is transmitted). Based on the monitoring symbol information and the repetitive symbol information mentioned above, the terminal 10 controls monitoring of the PDCCH repeatedly transmitted in plural symbols within the same slot.

Figure 7:
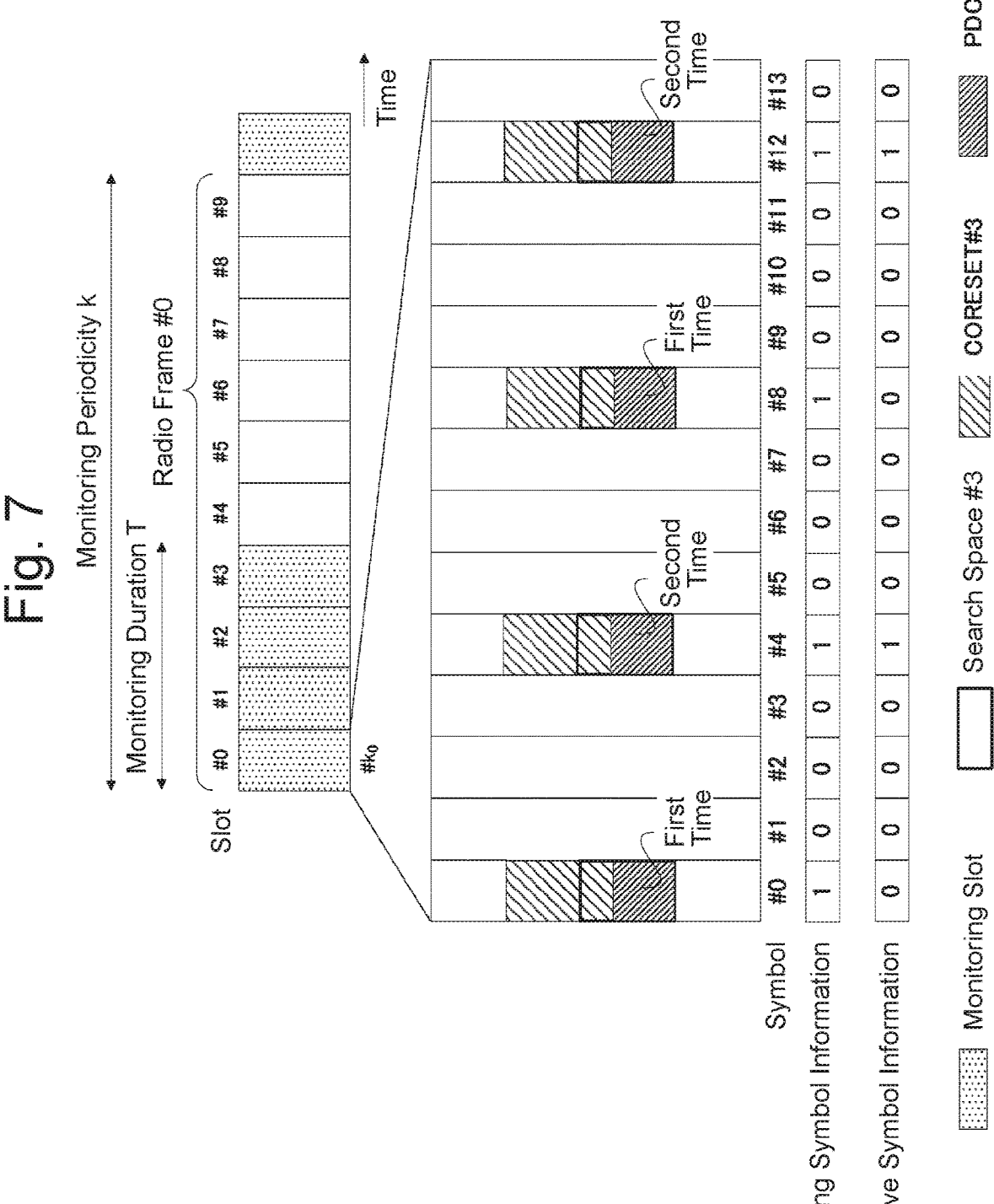
FIG. 7 is a diagram illustrating a first example of intra-slot repetition according to the present embodiment.

FIG. 7 is a diagram illustrating a first example of intra-slot repetition according to the present embodiment. In FIG. 7, a monitoring duration T of a search space #3 is configured in slots #0 to #3 in each radio frame based on search space information of the search space #3. Further, based on CORESET information of a CORESET #3 associated with the search space #3, the CORESET #3 is placed in symbols #0, #4 , #8, and #12 of each monitoring slot. The search space #3 is utilized as a repetitive search space.

In FIG. 7, monitoring symbol information in the search space information mentioned above indicates first symbols #0, #4 , #8, and #12 in which the search space #3 is placed. Further, the repetitive symbol information in the search space information mentioned above indicates the first symbols #4 and #12 in which the search space #3 for the second time and after is placed. For example, in FIG. 7, the repetitive symbol information is a 14-bit bitmap corresponding to symbols #0 to #13, respectively, and a bit corresponding to the symbols #4 and #12 is "1." Therefore, the terminal 10 assumes that the first-time PDCCH is mapped in the search space #3 of the symbol #0, and the second-time PDCCH is mapped in the search space #3 of the symbol #4. The same applies to symbols #8 and #12 as the symbols #0 and #4.

Note that in the repetitive symbol information in FIG. 7, the bit corresponding to the first symbol in which the PDCCH for the second time and after in one slot can be placed is set to "1," and the bit corresponding to the first symbol in which the first-transmitted PDCCH can be placed is set to "0," but the setting of bits is not limited to this example. The repetitive symbol information only needs to be information for identifying which of the first-transmitted PDCCH and the PDCCH for the second time and after is placed in each symbol. For example, the bit corresponding to the first symbol in which the PDCCH for the second time and after can be placed in one slot may be set to "0," and the bit corresponding to the first symbol in which the first-transmitted PDCCH can be placed may be set to "1."

(1.3) Combination of Inter-Slot Repetition and Intra-Slot Repetition

The inter-slot repetition and the intra-slot repetition described above may also be combined. Specifically, the terminal 10 may monitor one or more PDCCHs repeatedly transmitted in plural symbols that span across plural monitoring slots.

Figure 8:
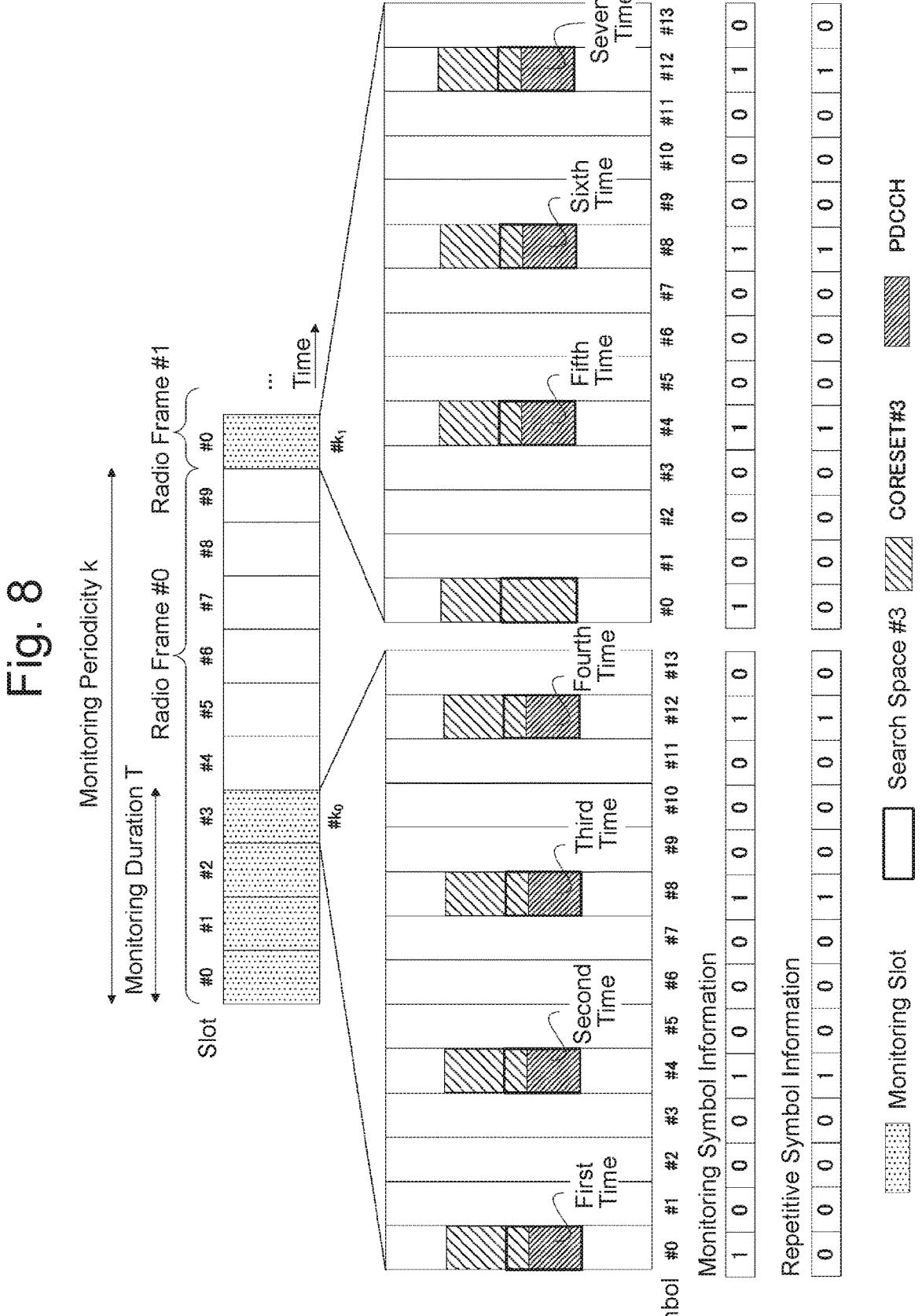
FIG. 8 is a diagram illustrating an example of a combination of inter-slot repetition and intra-slot repetition according to the present embodiment.

FIG. 8 is a diagram illustrating an example of a combination of inter-slot repetition and intra-slot repetition according to the present embodiment. Like in FIG. 7, the search space #3 and the CORESET #3 are configured in FIG. 8, but FIG. 8 differs from FIG. 7 in that repetition number R=7. In the following, description will be made by mainly focusing on differences from FIG. 7. In FIG. 8, repetitive symbol information indicates first symbols #4, #8, and #12 in which the search space #3 for PDCCH monitoring for the second time and after is placed.

As illustrated in FIG. 8, a symbol pattern in which the PDCCH for the second time and after is transmitted and indicated by the repetitive symbol information may be repeated across plural monitoring slots #$k_i$ ($0 \leq i \leq R_s-1$). Here, the number $R_s$ of monitoring slots for PDCCH of the repetition number R may be derived, for example, by $\text{ceil}\{(R-1)/n_{ss}\}$ based on the number R of repetitions and the number $n_{ss}$ of search spaces to which the PDCCH for the second time and after is mapped in one slot. In FIG. 8, since the repetition number R is 7 and the number $n_{ss}$ of search spaces is 3, $R_s$ is $\text{ceil}\{(7-1)/3\}=2$.

Although a monitoring slot #$k_0$ and a monitoring slot #$k_1$ are included in different monitoring durations in FIG. 8, the monitoring slots may of course be included in the same monitoring duration.

(1.4) Signaling of Repetition Information

Next, signaling of repetition information used for first PDCCH monitoring will be described. As mentioned above, the repetition information may include at least one of information indicative of the PDCCH repetition number R, information indicative of the maximum value of the repetition number R, start slot information, and repetitive symbol information.

The repetition information may be transmitted from the base station 20 to the terminal 10 using an upper layer parameter (higher layer parameter). The upper layer parameter may be an RRC layer parameter (for example, RRC IE), or may be a parameter of a Medium Access Control (MAC) layer (for example, a MAC control element (Medium Access Control Element: MAC CE)).

FIG. 9 is a diagram illustrating an example of search space information according to the present embodiment. In FIG. 9, an example in which RRC IE "SearchSpace" as search space information includes the repetition information mentioned above. Here, as the repetition information, information indicative of the repetition number R (for example, RRC IE "numRepetition-r17") and the repetitive symbol information (for example, RRC IE "repetitionSymbolsWithinSlot-r17") are indicated.

As illustrated in FIG. 9, the repetition number R may be, for example, any one of 1, 2, 4, 8, 16, 32, 64, 128, and 256. Further, RRC IE "repetitionSymbolsWithinSlot-r17" as the repetitive symbol information may be a 14-bit bitmap.

Note that FIG. 9 is just an illustrative example, the RRC IE "SearchSpace" may include, as the repetition information, information indicative of the maximum value of the repetition number R instead of the information indicative of the PDCCH repetition number R. Further, the RRC IE "SearchSpace" may include start slot information.

FIG. 10 is a diagram illustrating an example of derivation of a repetition number according to the present embodiment. In FIG. 10, an example of derivation of the repetition number R when the search space information (for example, RRC IE "SearchSpace") includes the information indicative of the maximum value of the PDCCH repetition number R is illustrated.

The terminal 10 may determine the PDCCH repetition number R based on a given field value in DCI and the above maximum value rep_max. For example, the given field value in DCI is associated with parameters r1 to r4 for deriving the repetition number R in FIG. 10. The terminal 10 determines the repetition number R based on the above maximum value rep_max and the parameters.

For example, in the case where the maximum value rep_max of the PDCCH repetition number R is 8, when the given field value in DCI is "00," repetition number R=rep_max/8=1 in FIG. 10. Similarly, when the given field value in DCI is "01," "10," or "11," repetition number R=2, 4, or 8.

As illustrated in FIG. 10, a coverage extension range can be controlled more flexibly by dynamically specifying the PDCCH repetition number R based on the DCI.

As described above, since each repetitive search space is configured based on the repetition information included in the search space information in the first PDCCH monitoring, monitoring of the PDCCH repeatedly transmitted using different time domain resources in a given-cycle monitoring duration can be controlled properly.

(2) Second PDCCH Monitoring

Monitoring of a PDCCH repeatedly transmitted in a frequency domain will be described in second PDCCH monitoring. The terminal 10 controls monitoring of the PDCCH repeatedly transmitted between plural frequency domain resources corresponding to one or more CORESETs.

A repetitive search space used for monitoring the PDCCH may be associated with a single CORESET (see 2.1 below), or may be associated with plural CORESETs (see 2.2 below).

(2.1) Repetitive Search Space Associated with Single CORESET

When the repetitive search space is associated with a single CORESET, plural frequency domain resources to which the PDCCH is repeatedly transmitted may correspond to the single CORESET.

CORESET information on the CORESET concerned may include plural pieces of frequency domain resource information respectively indicative of the plural frequency domain resources (see 2.1.1 below), may include frequency domain resource information indicative of one of the plural frequency domain resources and repetition number information indicative of the PDCCH repetition number (see 2.1.2 below), or may include frequency domain resource information indicative of one of the plural frequency domain resources and offset information indicative of an offset (see 2.1.3 below).

(2.1.1) First Determination Example of Repetitive Frequency Domain Resources

In a first determination example, the terminal 10 determines the plural frequency domain resources for the CORESET based on the plural pieces of frequency domain resource information included in the CORESET information on the single CORESET.

Figure 11:
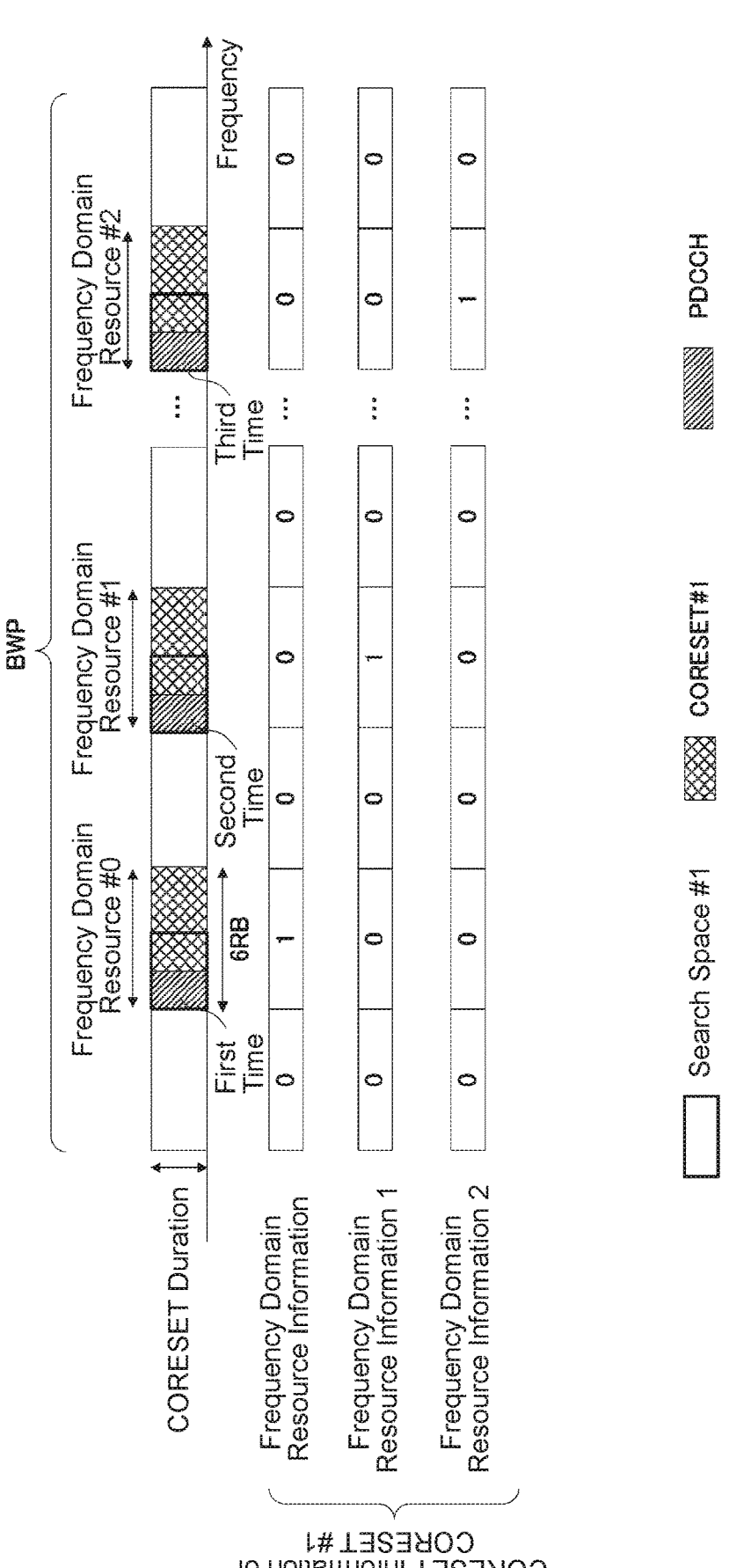
FIG. 11 is a diagram illustrating a first determination example of repetitive frequency domain resources according to the present embodiment.

FIG. 11 is a diagram illustrating a first determination example of repetitive frequency domain resources according to the present embodiment. For example, a CORESET #1 is associated with a search space #1 used as the repetitive search space in FIG. 11. It is assumed that CORESET information for the CORESET #1 includes frequency domain resource information 1 and frequency domain resource information 2 respectively indicative of frequency domain resources #1 and #2 for the CORESET #1 in addition to frequency domain resource information indicative of a frequency domain resource #0 for the CORESET #1.

The frequency domain resource information, the frequency domain resource information 1, and the frequency domain resource information 2 may be bitmaps including bits corresponding to groups of a given number of RBs (hereinafter called "RB groups"), respectively. The length of each of the bitmaps may be determined based on the number of RBs that configure a BWP and the number of RBs that configure one RB group. In FIG. 11, it is assumed that one RB group is composed of continuous six RBs, but it is not limited thereto, and one RB group only needs to be composed of one or more RBs.

In the frequency domain resource information, the frequency domain resource information 1, and the frequency domain resource information 2, a bit corresponding to an RB group that configures the frequency domain resources #0, #1, and #2 may be set to "1," and a bit corresponding to the other RB groups may be set to "0." Note that the frequency domain resources #0, #1, and #2 for the same CORESET #1 may be configured as different RB groups, respectively, and may not be allowed to include a duplicate RB group.

As illustrated in FIG. 11, the terminal 10 may assume that the search space #1 is placed respectively in the frequency domain resources #0, #1, and #2 for the CORESET #1. The terminal 10 may control monitoring of the (i+1)th PDCCH transmitted in a frequency domain resource #i (here 0≤i≤2) using the search space #1.

Note that it is assumed in FIG. 11 that CORESET durations of the CORESET #1 configured in the different frequency domain resources #0, #1, and #2 are the same, but it is not limited thereto, and the CORESET durations may be different. Thus, the CORESET duration of the CORESET #1 may be common to the plural frequency domain resources for the CORESET #1, or may be configured for each frequency domain resource for the CORESET #1.

FIG. 12 is a diagram illustrating a first example of CORESET information according to the present embodiment. For example, an example in which RRC IE "ControlResourceSet" as CORESET information includes plural pieces of frequency domain resource information respectively indicative of plural frequency domain resources for a CORESET, each of which is identified by RRC IE "controlResourceSetId," is illustrated in FIG. 12.

For example, in the RRC IE "ControlResourceSet" illustrated in FIG. 12, a first-transmitted frequency domain resource (for the first time) may be indicated by RRC IE "frequencyDomainResources." On the other hand, frequency domain resources for the second time and after may be indicated by RRC IE "frequencyDomainResourcesRepetition-r17."

Thus, the CORESET information may also include a list of frequency domain resource information for the second time and after (for example, RRC IE "frequencyDomainResourcesRepetition-r17") in addition to the frequency domain resource information for first-time transmission (for example, RRC IE "frequencyDomainResources"). For example, the number of entries in the list may be equal to the repetition number R−1. Each piece of frequency domain resource information for the second time and after may indicate an RB group that does not overlap with that of the frequency domain resource information for the first-time transmission.

Note that RRC IE "frequencyDomainResources" and RRC IE "frequencyDomainResourcesRepetition-r17" are bitmaps including bits corresponding to respective RB groups in the BWP and having 45 bits in FIG. 12, but they are not limited thereto as long as they are information indicative of frequency domain resources.

(2.1.2) Second Determination Example of Repetitive Frequency Domain Resources

In a second determination example, based on frequency domain resource information and repetition number information included in CORESET information on a single CORESET, the terminal 10 determines the plural frequency domain resources for the CORESET. In the second configuration example, description will be made by mainly focusing on differences from the first configuration example.

Figure 13:
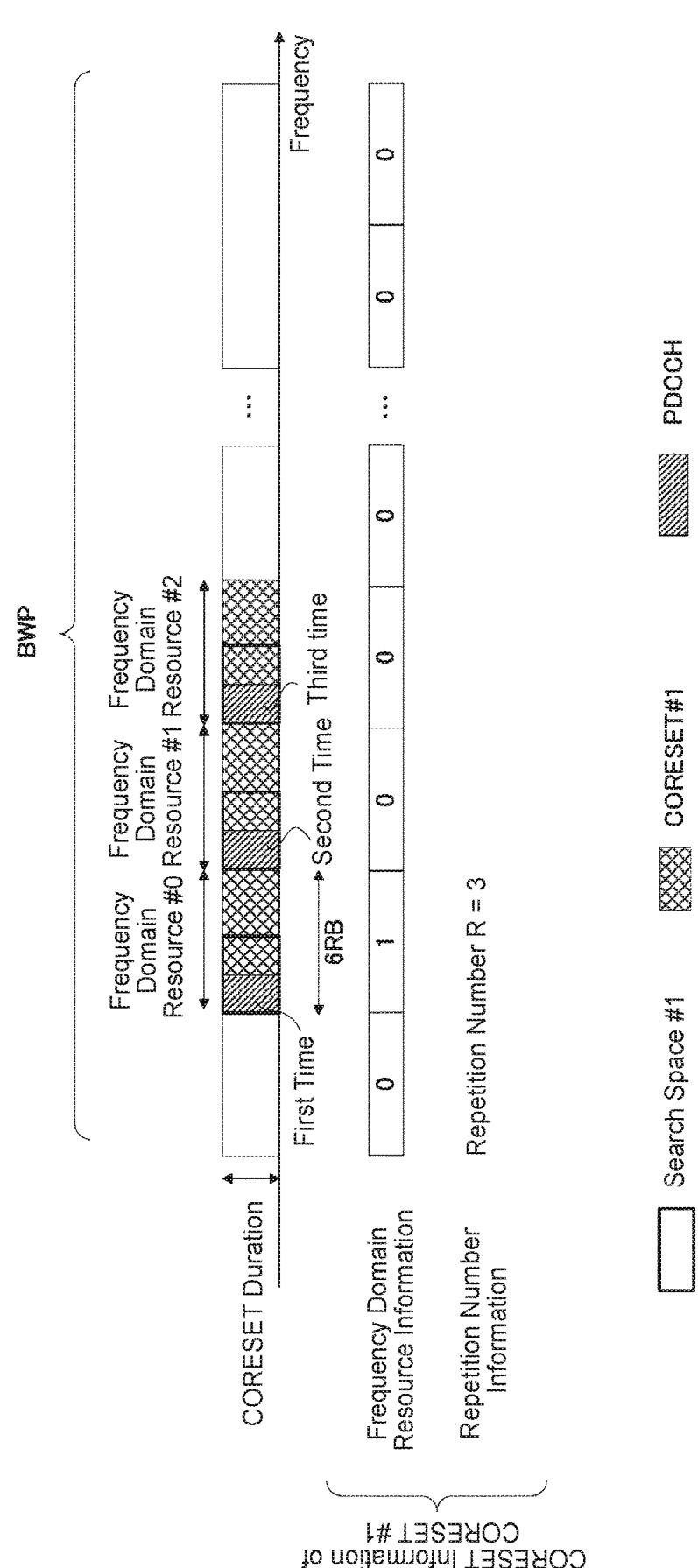
FIG. 13 is a diagram illustrating a second determination example of repetitive frequency domain resources according to the present embodiment.

FIG. 13 is a diagram illustrating the second determination example of repetitive frequency domain resources according to the present embodiment. FIG. 13 differs from FIG. 11 in that CORESET information for the CORESET #1 includes repetition number information indicative of the PDCCH repetition number R (here R=3) instead of the frequency domain resource information 1 and the frequency domain resource information 2 respectively indicative of the frequency domain resource #1 and the frequency domain resource #2 for the CORESET #1.

As illustrated in FIG. 13, the terminal 10 assumes that the frequency domain resources #0, #1, and #2 equal in number to the repetition number R are assigned for the CORESET #1 continuously from the frequency domain resource #0. Further, the terminal 10 assumes that the number of RBs of the frequency domain resources #1 and #2 is equal to the number of RBs (here, six RBs) of the frequency domain resource #0.

The terminal 10 may also assume that the search space #1 is placed respectively in the frequency domain resources #0, #1, and #2 determined based on the RBs (more specifically, the positions and number of RBs) assigned to the frequency domain resource #0 indicated by the frequency domain resource information, and the repetition number R as described above.

FIG. 14 is a diagram illustrating a second example of CORESET information according to the present embodiment. For example, in FIG. 14, RRC IE "ControlResourceSet" as CORESET information includes RRC IE "numRepetition-r17" indicative of the repetition number R of a PDCCH (or a CORESET) instead of RRC IE "frequencyDomainResourcesRepetition-r17" in FIG. 12. As illustrated in FIG. 14, the repetition number R may be configurable to any number such as 1, 2, 4, 8, 16, or 32.

Thus, the CORESET information may also include repetition number information (for example, RRC IE "numRepetition-r17") in addition to frequency domain resource information for the first-time transmission (for example, RRC IE "frequencyDomainResources"). Since the repetition number information is smaller in number of bits than respective pieces of frequency domain resource information for the second time and after illustrated in FIG. 12, the overhead by the CORESET information can be reduced in the second configuration example more than that in the first configuration example.

(2.1.3) Third Determination Example of Repetitive Frequency Domain Resources

In a third determination example, based on frequency domain resource information and offset information included in CORESET information on a single CORESET, the terminal 10 determines the plural frequency domain resources for the CORESET. In the third configuration example, description will be made by mainly focusing on differences from the first or second configuration example.

Figure 15:
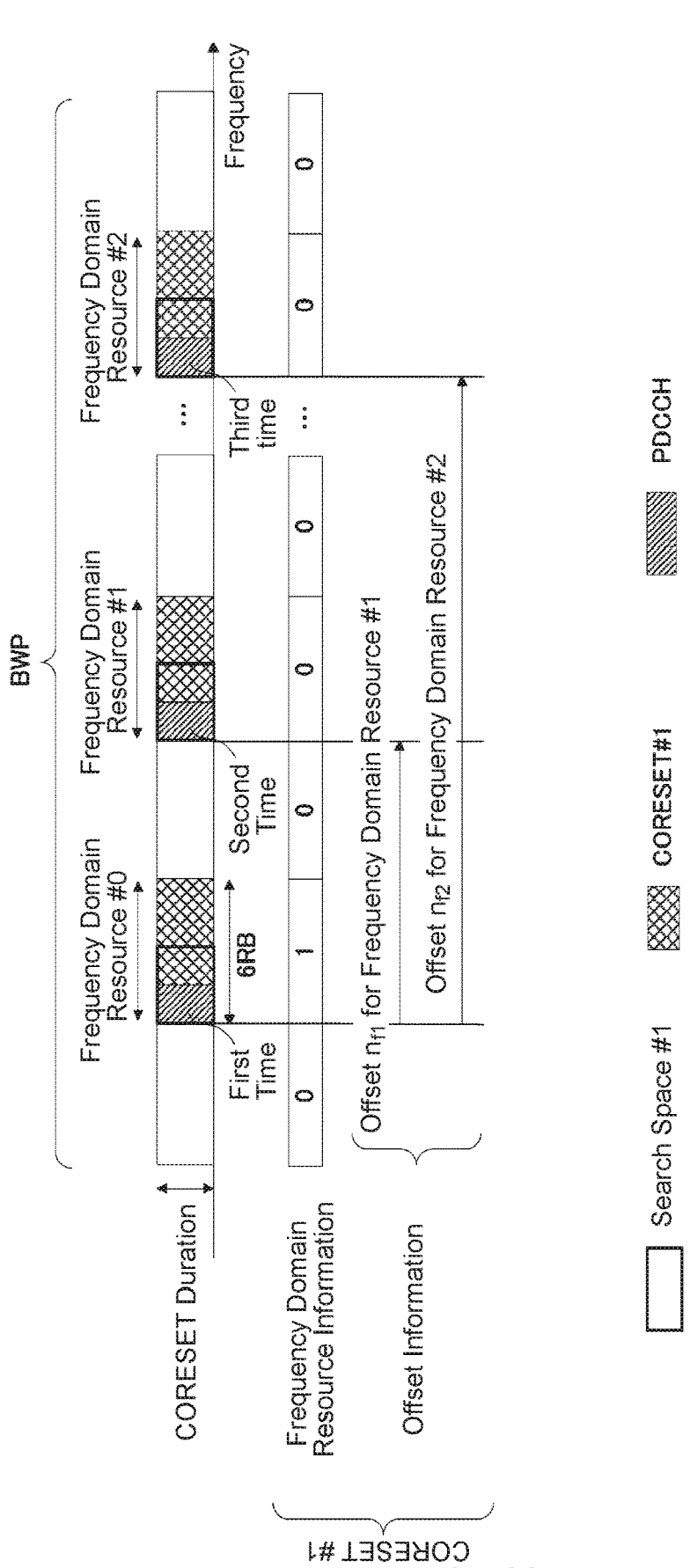
FIG. 15 is a diagram illustrating a second determination example of repetitive frequency domain resources according to the present embodiment.

FIG. 15 is a diagram illustrating the second determination example of repetitive frequency domain resources according to the present embodiment. FIG. 15 differs from FIG. 13 in that CORESET information for the CORESET #1 includes offset information indicative of an offset for each of the frequency domain resources #1 and #2 instead of the repetition number information.

For example, in FIG. 15, the offset information indicates offsets $n_{f1}$ and $n_{f2}$ respectively for the frequency domain resources #1 and #2 with respect to a start RB group of the frequency domain resource #0. The value of each offset may also indicate the number of RB groups to be shifted. In FIG. 15, offset $n_{f1}$=2, and this means that the frequency domain resource #1 is shifted by two RB groups from the start RB group of the frequency domain resource #0. Thus, the shift amount indicated by the offset value may be an integral multiple of the number of RBs (for example, six RBs) that configure one RB group, but it is not limited thereto as long as the shift amount is a given number of RBs.

The terminal 10 assumes that the frequency domain resource #0 indicated by the frequency domain resource information, and the frequency domain resources #1 and #2 shifted respectively by offsets $n_{f1}$ and $n_{f2}$ from the start RB group of the frequency domain resource #0 are assigned for the CORESET #1. Further, the terminal 10 assumes that the number of RBs of the frequency domain resources #1 and #2 is equal to the number of RBs (here, six RBs) of the frequency domain resource #0.

Note that it is assumed in FIG. 15 that an offset $n_{fi}$ for a frequency domain resource #i (i≥1) is an offset with respect to the start RB group of the frequency domain resource #0, but it is not limited thereto. The offset $n_{fi}$ for the frequency domain resource #i (i≥1) may also be an offset with respect to the last RB group of the frequency domain resource #0.

Further, the offset $n_{fi}$ for the frequency domain resource #i (i≥1) may be an offset with respect to the start RB group of a frequency domain resource #i-1. Alternatively, the offset $n_{fi}$ for the frequency domain resource #i (i≥1) may be an offset with respect to the last RB group of the frequency domain resource #i-1.

FIG. 16 is a diagram illustrating a third example of CORESET information according to the present embodiment. For example, in FIG. 16, RRC IE "ControlResource-Set" as CORESET information may include RRC IE "rbg-ShiftList-r17" indicative of respective offsets of repetitive frequency domain resources for the second time and after instead of RRC IE "frequencyDomainResourcesRepetition-r17" in FIG. 12. The RRC IE "rbg-ShiftList-r17" is a list of RRC IE "RBG-Shift-r17" indicative of offsets of respective frequency domain resources, and in RRC IE "RBG-Shift-r17," the offset value may be specifiable to any offset value, for example, among values from 1 to 32. Further, RRC IE "ControlResourceSet" may include RRC IE "numRepeti-tion-r17" indicative of the PDCCH repetition number R.

Thus, the CORESET information may also include offset information (for example, RRC IE "rbg-ShiftList-r17") indicative of offsets of respective frequency domain resources for the second time and after in addition to frequency domain resource information for the first-time transmission (for example, RRC IE "frequencyDomainRe-sources"). Since the offset information is smaller in number of bits than respective pieces of frequency domain resource information for the second time and after illustrated in FIG. 12, the overhead by the CORESET information can be reduced in the third configuration example more than that in the first configuration example. Further, since the frequency domain resource #i can be distributed and placed inside the BWP, a frequency diversity gain can be more improved than that in the second configuration example.

Note that the base station 20 specifies the offset $n_{fi}$ for each of repetitive frequency domain resources #i (0<i<R) for the second time and after in the above, but it is not limited thereto. An offset $n_f$ common to the repetitive frequency domain resources #i (0<i<R) for the second time and after may be specified by the base station 20. The CORESET information mentioned above may also include offset information indicative of the common offset $n_f$.

Figure 17:
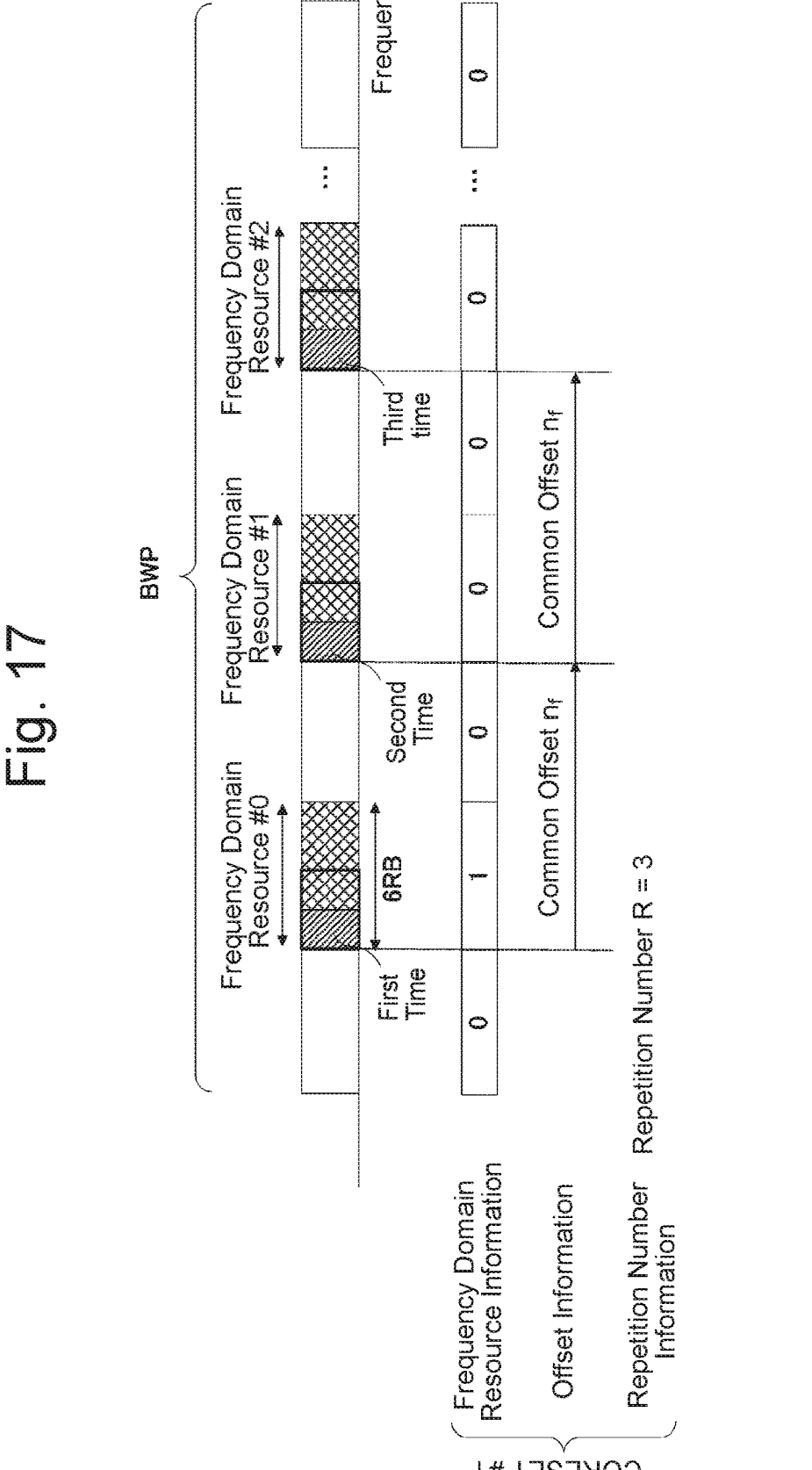
FIG. 17 is a diagram illustrating a fourth determination example of repetitive frequency domain resources according to the present embodiment.

FIG. 17 is a diagram illustrating a fourth determination example of repetitive frequency domain resources according to the present embodiment. FIG. 17 differs from FIG. 15 in that the common offset $n_f$ is used for each of the repetitive frequency domain resources #i (0<i<R) for the second time and after. As illustrated in FIG. 17, the common offset $n_f$ may also be an offset for the frequency domain resource #i with respect to the start RB group of a frequency domain resource #i-1 (i>0). Though not illustrated, the common offset $n_f$ may also be an offset for the frequency domain resource #i with respect to the last RB group of the frequency domain resource #i-1 (i>0).

As illustrated in FIG. 17, CORESET information may also include offset information indicative of an offset common to repetitive frequency domain resources for the second time and after, and repetition information indicative of the repetition number R of a PDCCH (or a CORESET). The terminal 10 assumes that the frequency domain resource #0 indicated by the frequency domain resource information, the frequency domain resource #1 shifted by the common offset $n_f$ from the start RB group of the frequency domain resource #0, and the frequency domain resource #2 shifted by the common offset $n_f$ from the start RB group of the frequency domain resource #1 are assigned for a CORESET #1. Further, the terminal 10 assumes that the number of RBs of the frequency domain resources #1 and #2 is equal to the number of RBs of the frequency domain resource #0 (here, six RBs).

As described above, when the repetitive search space is associated with a single CORESET, a PDCCH can be repeated between plural frequency domain resources by configuring the plural frequency domain resources for the single CORESET. In this case, repetitions of the PDCCH between the plural frequency domain resources can be realized by changing the above CORESET information without changing the above search space information.

(2.2) Repetitive Search Space Associated with Plural CORESETs

When the repetitive search space is associated with plural CORESETs, plural frequency domain resources to which a PDCCH is repeatedly transmitted may correspond to the plural CORESETs, respectively. Search space information on the repetitive search space may also include respective pieces of identification information on the plural CORE-SETs.

Based on plural pieces of CORESET information respectively for the above plural CORESETs, the terminal 10 determines respective frequency domain resources of the plural CORESETs. Specifically, the terminal 10 determines each of frequency domain resources of the plural CORE-SETs based on frequency domain resource information included in each of the plural pieces of CORESET information.

Figure 18:
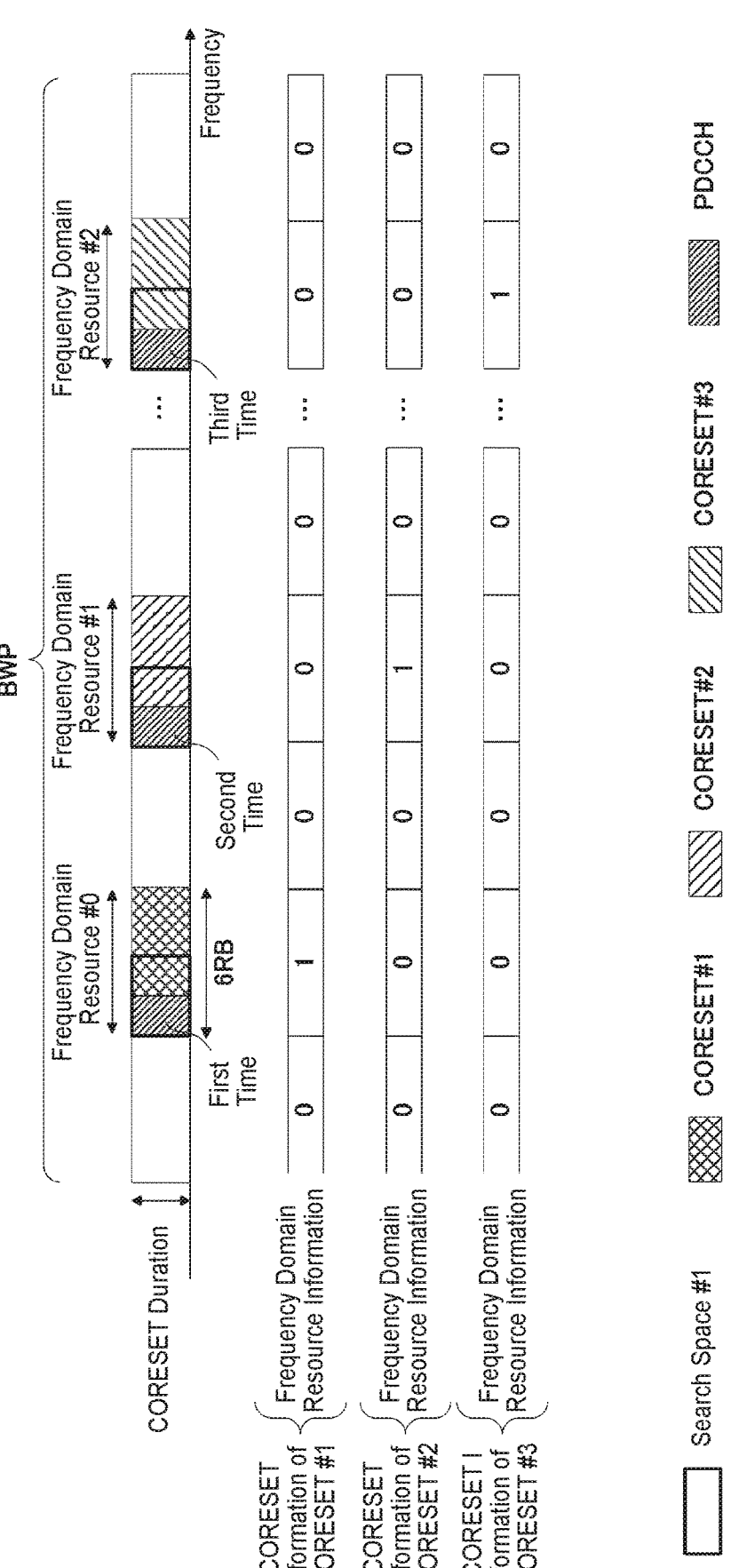
FIG. 18 is a diagram illustrating a fifth determination example of repetitive frequency domain resources according to the present embodiment.

FIG. 18 is a diagram illustrating a fifth determination example of repetitive frequency domain resources according to the present embodiment. For example, it is assumed in FIG. 18 that CORESETs #1, #2, and #3 are associated with the search space #1 used as the repetitive search space, and respective pieces of CORESET information of the CORE-SETs #1, #2, and #3 include respective pieces of frequency domain resource information indicative of the frequency domain resources #0, #1, and #2, respectively. Each piece of frequency domain resource information is as described with reference to FIG. 11.

As illustrated in FIG. 18, the terminal 10 may also assume that the search space #1 is placed respectively in the frequency domain resources #0, #1, and #2 for the CORESETs #1, #2, and #3 associated with the search space #1. Further, the terminal 10 may monitor the search space #1 associated with the CORESET #i on the assumption that the repetitive PDCCH for the i-th time is transmitted, for example, by using a frequency domain resource for a CORESET #i (here, i≥1).

Note that CORESET durations of the CORESETs #1, #2, and #3 associated with the repetitive search space #1 are the same in FIG. 18, but it is not limited thereto, and the CORESET durations may be different from one another. Thus, when plural CORESETs are associated with the repetitive search space #1, a CORESET duration, a frequency domain resource, and the like can be configured flexibly for each repetition.

FIG. 19 is a diagram illustrating an example of search space information according to the present embodiment. For example, an example in which RRC IE "SearchSpace" as search space information includes identification information of plural CORESETs associated with a repetitive search space is illustrated in FIG. 19.

For example, in the RRC IE "SearchSpace" illustrated in FIG. 19, a CORESET in which a repetitive search space for monitoring the first-transmitted PDCCH (for the first time) is placed may be indicated by RRC IE "controlResource-SetId." On the other hand, a CORESET in which a repetitive search space for monitoring the PDCCH for the second time and after is placed may be indicated by RRC IE "control-ResourceSetRepetition-r17."

Thus, the search space information may also include a list (for example, RRC IE "controlResourceSetRepetition-r17") of CORESET identification information for the second time and after (for example, RRC IE "ControlResoruceSetId") in addition to CORESET identification information for the first-time transmission (for example, RRC IE "ControlRe-soruceSetId"). The number of entries in the list may be equal to the repetition number R−1.

The CORESET information on a repetitive CORESET as described above may be notified from the base station 20 to the terminal 10 in a manner to be distinguished from the CORESET for the first-time transmission. Specifically, the list of the CORESET information may be included in information on a PDCCH (hereinafter called "PDCCH infor-mation"). The PDCCH information may also include PDCCH information specific to the terminal 10 (hereinafter called "specific PDCCH information"), and/or PDCCH information common to one or more terminals 10 (herein-after called "common PDCCH information").

FIG. 20 is a diagram illustrating an example of PDCCH information according to the present embodiment. In FIG. 20, an example in which RRC IE "PDCCH-Config" as the individual PDCCH information and RRC IE "PDCCH-ConfigCommon" as the common PDCCH information include CORESET information on plural CORESETs asso-ciated with a repetitive search space and identification information is illustrated.

For example, RRC IE "PDCCH-Config" illustrated in FIG. 20 includes RRC IE "repetitionControlResourceSet-ToAddModList-r17," and the RRC IE "repetitionControl-ResourceSetToAddModList-r17" may be a list of RRC IE "ControlResourceSet" as CORESET information of CORE-SETs in which the repetitive search space for monitoring of a PDCCH for the second time and after is placed. Further, RRC IE "PDCCH-Config" may also include RRC IE "rep-etitionControlResourceSetToReleaseList-r17" as a list of RRC IE "ControlResourceSetId" as identification informa-tion of the CORESET. Further, RRC IE "PDCCH-Config-Common" illustrated in FIG. 20 may include RRC IE "repetitionControlResourceSetToAddModList-r17" men-tioned above.

Thus, by the individual PDCCH information and the common PDCCH information included in the CORESET information on the CORESET in which the repetitive search space is placed (for example, RRC IE "repetitionControl-ResourceSetToAddModList-r17"), both the PDCCH indi-vidual to the terminal 10 and the PDCCH common to the one or more terminals 10 can be repeatedly transmitted by using the plural CORESETs.

As described above, when the repetitive search space is associated with plural CORESETs, plural frequency domain resources corresponding respectively to the plural CORE-SETs can be configured to enable a PDCCH to be repeated between the plural frequency domain resources. In this case, repetitions of the PDCCH between the plural frequency domain resources can be realized by changing the search space information and/or the PDCCH information men-tioned above without changing the above CORESET infor-mation.

(3) Combination of First and Second PDCCH Monitoring

In the above first PDCCH monitoring, a case is assumed where the terminal 10 controls monitoring of a PDCCH repeatedly transmitted using the same frequency domain resource between different time domain resources (for example, between slots and/or between symbols in the same slot), but it is not limited thereto.

In the above first PDCCH monitoring, the terminal 10 may also control monitoring of a PDCCH repeatedly trans-mitted using different frequency domain resources between different time domain resources (for example, between slots and/or between symbols in the same slot). In other words, the first PDCCH monitoring can be combined with the second PDCCH monitoring.

Further, in the above second PDCCH monitoring, a case is assumed where the terminal 10 controls monitoring of a PDCCH repeatedly transmitted between plural frequency domain resources corresponding to one or more CORESETs in the same time domain resource within a given-cycle monitoring duration, but it is not limited thereto.

In the above second PDCCH monitoring, in different time domain resources within the given-cycle monitoring dura-tion, the terminal 10 may also control monitoring of the PDCCH repeatedly transmitted between the plural fre-quency domain resources corresponding to the one or more time domain resources. In other words, the second PDCCH monitoring can be combined with the first PDCCH moni-toring.

Thus, repetitions of the PDCCH using a different fre-quency domain resource for each time domain resource in the given-cycle monitoring duration by the combination of the first PDCCH monitoring and the second PDCCH moni-toring may also be called "frequency hopping."

Figure 21:
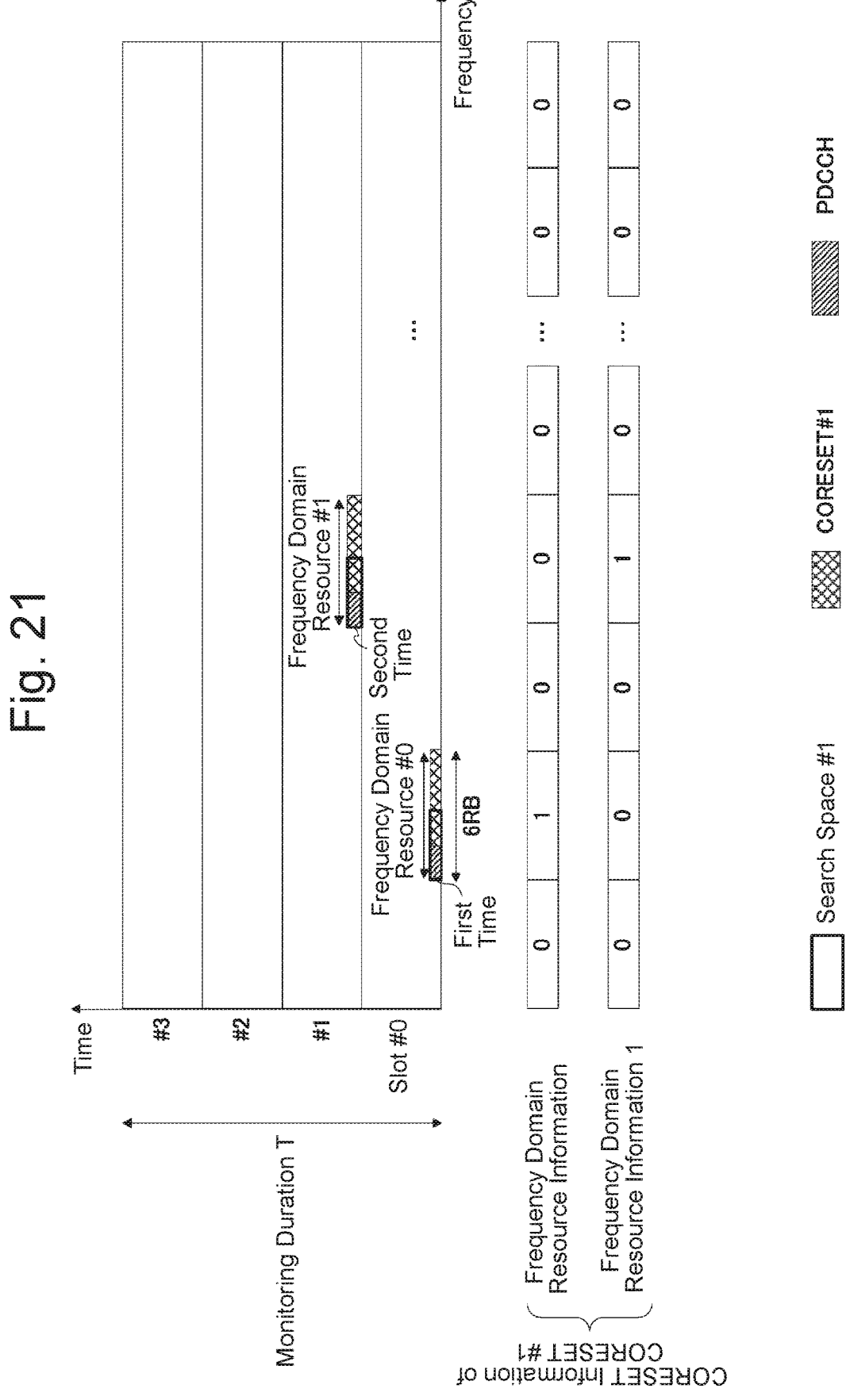
FIG. 21 is a diagram illustrating an example of repeated transmission of a PDCCH to which frequency hopping according to the present embodiment is applied.

FIG. 21 is a diagram illustrating an example of repeated transmission of a PDCCH to which the frequency hopping according to the present embodiment is applied. For example, a combination of inter-slot repetition illustrated in FIG. 2 and the first determination example of repetitive frequency domain resources illustrated in FIG. 11 is illus-trated in FIG. 21 as an example. Though not illustrated, what aspects described in the first PDCCH monitoring and the second PDCCH monitoring may of course be combined.

As illustrated in FIG. 21, different frequency domain resources #0 and #1 corresponding to a CORESET #1 are used between repetitive monitoring slots #0 and #1. The terminal 10 may control monitoring of a search space #1 on the assumption that the first-time PDCCH is transmitted using the frequency domain resource #0 in the monitoring slot #0, while the second-time PDCCH is transmitted using the frequency domain resource #1 in the monitoring slot #1.

Note that it is assumed in FIG. 21 that numbers of frequency domain resources #0 and #1 equal in number to a PDCCH repetition number R (for example, R=2 in FIG. 21) for the CORESET #1 associated with the repetitive search space #1 are configured, but it is not limited thereto. The number NFR of frequency domain resources configured for the CORESET #1 may be smaller than or larger than the repetition number R. When repetition number R>number NFR of frequency domain resources, a repetitive search space may be placed in the same frequency domain resource for each given number of repetitions. For example, the frequency domain resource #0 may be used for each odd number of repetitions and the frequency domain resource #1 may be used for each even number of repetitions.

(4) Search Space Group Switching Control

Next, search space group switching control will be described. In the present embodiment, a repetitive search space described in (1) to (3) mentioned above may be associated with one or more search space groups. For example, search space information (for example, RRC IE "SearchSpace") may also include search space group information (for example, RRC IE "searchSpaceGroupIdList") indicative of one or more search space groups associated with the repetitive search space.

Figure 22:
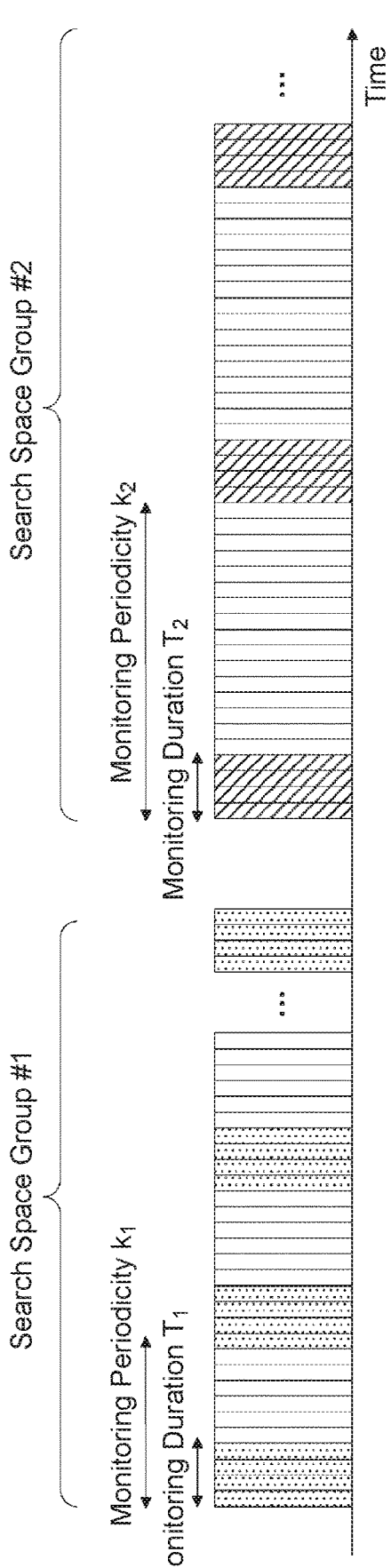
FIG. 22 is a diagram illustrating an example of switching of search space groups according to the present embodiment.

The terminal 10 controls switching of search space groups based on a given field value of DCI. FIG. 22 is a diagram illustrating an example of switching of search space groups according to the present embodiment. In FIG. 22, an example in which the terminal 10 switches a search space group used for monitoring of a repeatedly transmitted PDCCH from a search space group #1 to a search space group #2.

For example, in FIG. 22, a monitoring periodicity $k_2$ of a repetitive search space associated with the search space group #2 is longer than a monitoring periodicity $k_1$ of the repetitive search space associated with the search space group #1. Note that it is assumed in FIG. 22 that monitoring durations $T_1$ and $T_2$ of the search space respectively associated with the search space groups #1 and #2 are the same, but it is not limited thereto. The search space associated with each search space group (for example, a monitoring periodicity k, a monitoring duration T, a start slot of the duration T, the number of PDCCH candidates for each aggregation level, symbols in which the search space is placed in a monitoring slot, and the like) can be configured freely by search space information for the search space.

In FIG. 22, the terminal 10 controls switching of search space groups based on the given field value in the DCI. Further, the terminal 10 controls monitoring of the PDCCH using the repetitive search space associated with the search space group based on the given field value in the DCI.

FIG. 23 is a diagram illustrating an example of DCI used for switching control of search space groups according to the present embodiment. As illustrated in FIG. 23, the DCI may be a DCI format (for example, DCI format 1_X) used for scheduling of downlink shared channels, or a DCI format (for example, DCI format 0_X) used for scheduling of uplink shared channels. Here, X is any integer.

In the following, as an example of each downlink shared channel and each uplink shared channel, a physical downlink shared channel (PDSCH) and a physical uplink shared channel (PUSCH) will be described, but the names of the downlink shared channel and the uplink shared channel are not limited to the PDSCH and the PUSCH as long as they are channels used for transmission of user data and/or upper layer parameters.

As illustrated in FIG. 23, the DCI format 1_X or 0_X may also include a search space group switching field used for switching of search space groups, a resource allocation field indicative of a resource allocated to the PDSCH or the PUSCH, and the like.

Alternatively, as illustrated in FIG. 23, the above DCI may also be the DCI format (for example, DCI format 2_X) used for other than scheduling of the PDSCH or the PUSCH. Here, X is any integer. As illustrated in FIG. 23, the DCI format 2_X may also include M search space group switching fields #1 to #M (M≥1). Here, for example, M may be the number of cells C configured in the terminal 10. Note that the DCI format 2_X is not limited to that illustrated, and it may of course include a single search space group switching field.

FIG. 24 is a diagram illustrating an example of values of search group switching fields according to the present embodiment. Note that each search group switching field in FIG. 23 and FIG. 24 only needs to be a given field in the DCI, and the name is not limited thereto. Further, the search group switching field shall be two bits in FIG. 24, but the value is not limited thereto, and the value only needs to be one or more bits.

As illustrated in FIG. 24, each value of the search group switching field may indicate a search space group to switch to. In FIG. 24, the search space group to switch to and indicated by each value of the search group switching field is configured in the terminal 10 by an upper layer parameter, but it is not limited thereto and the search space group to switch to may be defined in advance in the specification.

Further, in the terminal 10, the value of the search group switching field may indicate information on the repetition number R of the PDCCH to be monitored in a search space associated with the search space group indicated by the value. For example, in FIG. 24, the information on the repetition number R indicates any one of parameter values r1 to r4, but it is not limited thereto, and the information may also indicate the repetition number R itself. The terminal 10 receives information on the maximum value rep_max of the repetition number R in addition to the DCI.

As illustrated in FIG. 24, the terminal 10 may determine the repetition number R by the maximum value rep_max and the parameter value indicated by the value of the search group switching field mentioned above. Note that FIG. 24 is just an illustrative example, and the repetition number R associated with each value of the search group switching field may also, of course, be defined in the specification.

Further, when the DCI including the above search group switching field is the DCI format used for scheduling of the PDSCH or the PUSCH (for example, the DCI format 1_X or 0_X), the terminal 10 may determine the repetition number R of the PDSCH or the PUSCH based on the value of the search group switching field. Thus, the repetition number R derived by the value of the search space group switching field of the DCI format 1_X or 0_X in FIG. 23 may be the repetition number R of the PDSCH or the PUSCH. Note that the repetition number R of the PDSCH or the PUSCH can be derived in the same way as the PDCCH repetition number R mentioned above.

Further, the DCI format (for example, the DCI format 1_X or 0_X) used for scheduling of the PDSCH or the PUSCH may include a given field value used to derive the repetition number R of the PDSCH or the PUSCH in addition to the value of the above search group switching field. In this case, the terminal 10 may determine the PDCCH repetition number R based on the value of the search space group switching field, and determine the repetition number R of the PDSCH or the PUSCH based on the given field value.

Further, in the terminal 10, the value of each search space group switching field in another DCI format (for example, DCI format 2_X) used for other than scheduling of the PDSCH or the PUSCH mentioned above may be used to derive the repetition number R of the PDSCH and/or the PUSCH mentioned above. Alternatively, the value of the search space group switching field in the DCI format may be used to derive the PDCCH repetition number R, and the other field value in the DCI format may be used to derive the repetition number R of the PDSCH or the PUSCH.

As described above, when a search space group is dynamically switched by using the DCI, the repetition number R of the PDCCH to be monitored in a search space associated with the search space group can be dynamically controlled. Therefore, monitoring of the PDCCH can be controlled properly. Further, the repetition number of the PDSCH or the PUSCH scheduled by the DCI can also be dynamically controlled.

Configuration of Wireless Communication System

Next, the configuration of each equipment in the above wireless communication system 1 will be described. Note that the configuration below is to illustrate the configuration required for the description of the present embodiment, and it is not excluded that each equipment includes any functional block other than those to be illustrated.

Hardware Configuration

Figure 25:
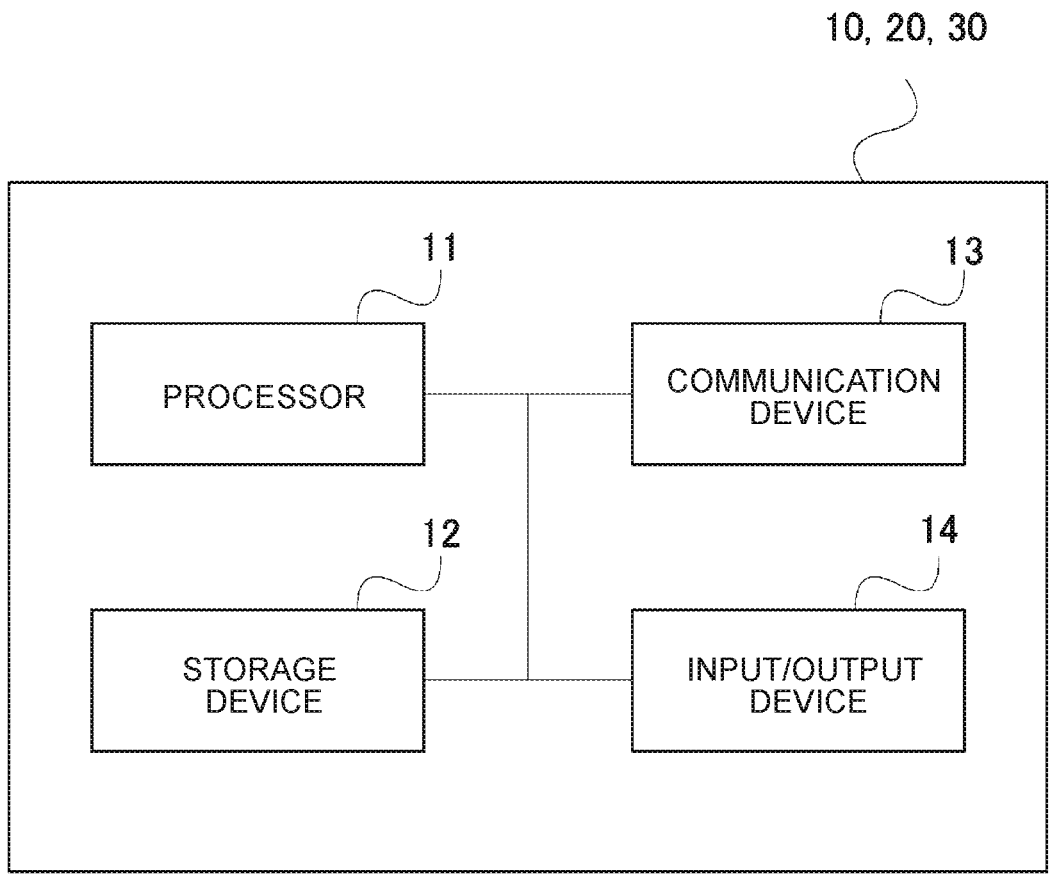
FIG. 25 is a diagram illustrating an example of the hardware configuration of each equipment in the wireless communication system according to the present embodiment.

FIG. 25 is a diagram illustrating an example of the hardware configuration of each equipment in the wireless communication system according to the present embodiment. Each equipment in the wireless communication system 1 (for example, the terminal 10, the base station 20, or the core network (CN) 30) includes a processor 11, a storage device 12, a communication device 13 for performing wired or wireless communication, and an input/output device 14 for accepting various input operations and outputting various information.

The processor 11 is, for example, a CPU (Central Processing Unit) to control each equipment in the wireless communication system 1. The processor 11 may read and execute a program from the storage device 12 to perform various processing to be described in the present embodiment. Each equipment in the wireless communication system 1 may also be configured to include one or more processors 11. Further, each equipment concerned may also be called a computer.

The storage device 12 is composed, for example, of storages such as a memory, an HDD (Hard Disk Drive), and/or an SSD (Solid State Drive). The storage device 12 may also store various information required to perform processing by the processor 11 (for example, programs and the like executed by the processor 11).

The communication device 13 is a device for performing communication through wired and/or wireless networks, which may include a network card, a communication module, a chip, an antenna, and the like, for example. Further, an amplifier, an RF (Radio Frequency) device for performing processing on radio signals, and a BB (BaseBand) device for performing processing on baseband signals may be included in the communication device 13.

The RF device performs D/A conversion, modulation, frequency conversion, power amplification, and the like on a digital baseband signal, for example, received from the BB device to generate a radio signal to be transmitted from the antenna A. Further, the RF device performs frequency conversion, demodulation, A/D conversion, and the like on a radio signal received from the antenna to generate and transmit a digital baseband signal to the BB device. The BB device performs processing for converting the digital baseband signal to a packet, and processing for converting a packet to a digital baseband signal.

The input/output device 14 includes, for example, input devices such as a keyboard, a touch panel, a mouse, and/or a microphone, and output devices such as a display and/or a speaker.

Note that the hardware configuration described above is just an example. In each equipment inside the wireless communication system 1, part of hardware illustrated in FIG. 25 may be omitted, or any other hardware unillustrated in FIG. 25 may be included. Further, the hardware illustrated in FIG. 4 may be configured by one or more chips.

Functional Block Configuration

Terminal

Figure 26:
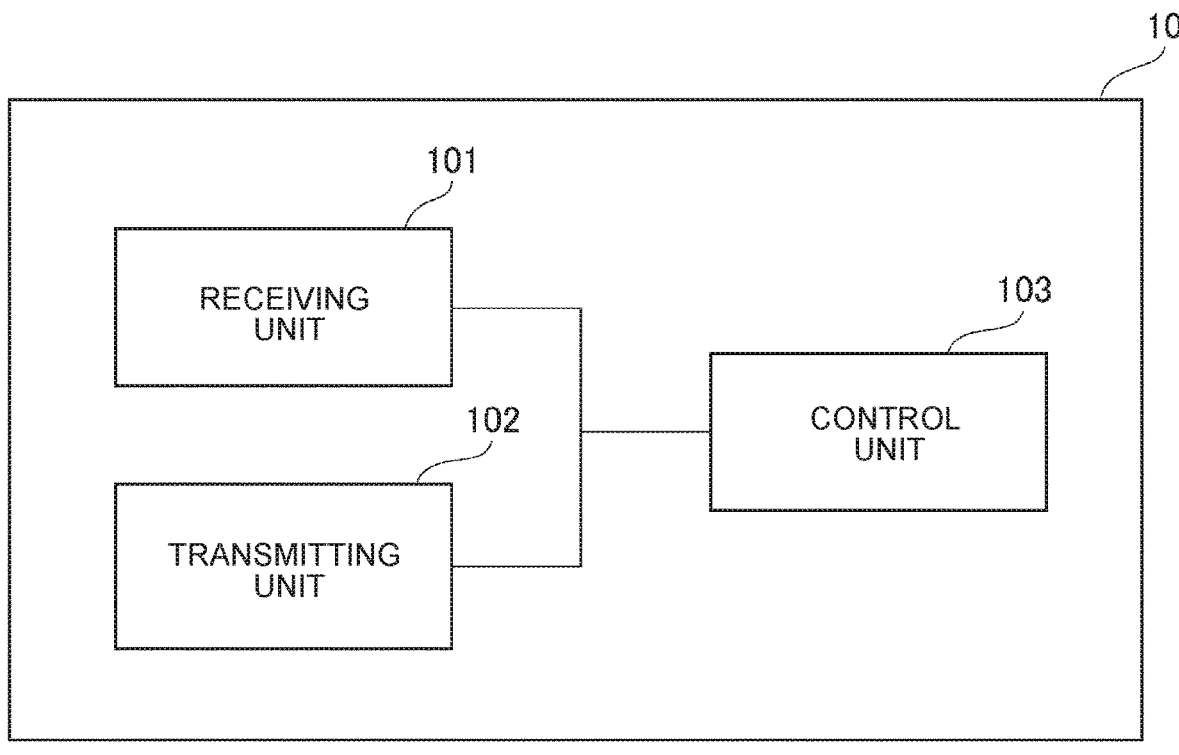
FIG. 26 is a diagram illustrating an example of the functional block configuration of a terminal according to the present embodiment.

FIG. 26 is a diagram illustrating an example of the functional block configuration of the terminal according to the present embodiment. As illustrated in FIG. 26, the terminal 10 includes a receiving unit 101, a transmitting unit 102, and a control unit 103.

Note that all or some of the functions implemented by the receiving unit 101 and the transmitting unit 102 can be realized by using the communication device 13. Further, all or some of the functions implemented by the receiving unit 101 and the transmitting unit 102, and the function of the control unit 103 can be realized by the processor 11 executing a program stored in the storage device 12. Further, the program can be stored on a storage medium. The storage medium with the program stored thereon may be a non-transitory computer readable medium. However, the storage medium is not particularly limited to the non-transitory computer readable medium, which may also be any other storage medium such as a USB memory or a CD-ROM.

The receiving unit 101 receives downlink signals. The receiving unit 101 may also receive information and/or data transmitted through each downlink signal. Here, for example, the verb "receive" may also include the meaning of performing processing related to reception including at least one of the reception, demapping, demodulation, decoding, monitoring, and measurement of a radio signal.

For example, the downlink signal may include at least one of a PDCCH, aPDSCH, a downlink reference signal, a sync signal, and a broadcast channel mentioned above. The downlink reference signal may also include a demodulation reference signal (DMRS) for the PDCCH or the PDSCH, for example.

Further, the receiving unit 101 receives DCI. Specifically, the receiving unit 101 may monitor a search space to detect the PDCCH in order to receive the DCI transmitted through the PDCCH. The receiving unit 101 may also receive the PDSCH based on the DCI to receive user data and/or an upper layer parameter(s) transmitted through the PDSCH. Further, the receiving unit 101 may transmit DCI including a given field value used for switching of search space groups (for example, FIG. 23).

The receiving unit 101 may also receive search space information on a search space associated with a control resource set (CORESET) (for example, FIG. 9 and FIG. 19). Further, the receiving unit 101 may receive CORESET

US 12,563,575 B2

23 information on one or more CORESETs associated with the search space (for example, FIGS. 12, 14, and 16).

Further, the receiving unit 101 may receive the above-mentioned PDCCH information (for example, FIG. 20). The PDCCH information may be information for each given bandwidth (for example, each BWP or cell C) configured in the terminal 10, and may also include the CORESET information on one or more CORESETs used in the given bandwidth, and search space information on one or more search spaces.

Further, the receiving unit 101 may receive information indicative of the maximum value of the repetition number R (for example, FIG. 24). The information may also be included in the above search space information.

Further, the receiving unit 101 may synthesize PDCCHs repeatedly transmitted, and decode the DCI based on the synthesis result. Alternatively, the receiving unit 101 may decode the DCI based on each PDCCH without synthesizing the PDCCHs repeatedly transmitted.

The transmitting unit 102 transmits uplink signals. The transmitting unit 102 may also transmit information and/or data to be transmitted through each uplink signal. Here, for example, the verb "transmit" may also include the meaning of performing processing related to transmission including at least one of the encoding, modulation, mapping, and transmission of a radio signal. For example, the unlink signal may also include at least one of the above-mentioned PUSCH, an uplink reference signal, and the like. For example, the uplink reference signal may also include a DMRS or the like of the PUSCH.

The control unit 103 performs various controls on the terminal 10. Specifically, based on the above search space information and/or the above CORESET information, the control unit 103 may control monitoring of each downlink control channel using a search space in a given-cycle monitoring duration T.

Based on repetition information related to the repetition of each PDCCH included in the above search space information, the control unit 103 may control monitoring of the PDCCH between different slots and/or in the same slot within the monitoring duration T (see (1) mentioned above).

Here, the above repetition information may also include information indicative of the PDCCH repetition number R. The control unit 103 may determine the above-mentioned different slots based on the repetition number R (for example, FIGS. 4 to 6, 8, and 9).

Further, the above repetition information may include information indicative of the maximum value of the PDCCH repetition number R. Based on the maximum value and the repetition number R determined based on the given value in the DCI, the control unit 103 may determine the above-mentioned different slots (for example, FIGS. 4 to 6, 8, and 10).

Further, the above repetition information may include information indicative of a repetition start slot #$k_0$ of the PDCCH. The control unit 103 may also determine the different slots based on the start slot #$k_0$ (for example, FIGS. 4 to 8).

Note that the above-mentioned different slots may be plural slots in one monitoring duration T among given-cycle monitoring durations T (for example, FIG. 4), or may be plural slots that span across two or more durations among the given-cycle monitoring durations T (for example, FIGS. 5, 6, and 8).

Further, the above repetition information may include repetitive symbol information indicative of symbols in which the PDCCH is repeated. Based on the repetitive

24 symbol information and monitoring symbol information indicative of symbols for monitoring the PDCCH, the control unit 103 may determine plural symbols for monitoring the PDCCH in the same slot mentioned above (for example, FIG. 7 and FIG. 8).

The control unit 103 may control monitoring of the PDCCH repeatedly transmitted using the same frequency domain resource between the above-mentioned different slots and/or in the above-mentioned same slot (see (1) mentioned above). Further, the control unit 103 may control monitoring of the PDCCH repeatedly transmitted using different frequency domain resources between the above-mentioned different slots and/or in the same slot (see (3) mentioned above, for example, FIG. 21).

The control unit 103 may also control monitoring of the PDCCH repeatedly transmitted between plural frequency domain resources corresponding to the one or more CORESETs mentioned above (see (2) mentioned above).

Here, the search space may be associated with a single CORESET, and the above plural frequency domain resources may correspond to the single CORESET (see (2.1) mentioned above).

CORESET information for the single CORESET may also include plural pieces of frequency domain resource information respectively indicative of the above plural frequency domain resources. The control unit 103 may determine the above plural frequency domain resources based on the plural pieces of frequency domain resource information mentioned above (for example, FIG. 11 and FIG. 12).

Further, the CORESET information for the single CORESET may include frequency domain resource information indicative of one of the above frequency domain resources, and repetition number information indicative of the repetition number R of the PDCCH. Based on the frequency domain resource information and the repetition number information, the control unit 103 may determine the plural frequency domain resources mentioned above (for example, FIG. 13 and FIG. 14).

Further, the CORESET information for the single CORESET may include frequency domain resource information indicative of one of the above plural frequency domain resources, and offset information indicative of an offset for any other frequency domain resource among the plural frequency domain resources. The control unit 103 may determine the above plural frequency domain resources based on the frequency domain resource information and the offset information (for example, FIGS. 15 to 17).

Further, the search space may be associated with plural CORESETs, and the above plural frequency domain resources may correspond to the plural CORESETs, respectively (see (2.2) mentioned above).

Based on plural pieces of CORESET information respectively related to the plural CORESETs, the control unit 103 may determine the above plural frequency domain resources (for example, FIGS. 18 to 20).

The control unit 103 may determine a given-cycle monitoring duration T for monitoring the PDCCH using the search space based on the above search space information. Further, the control unit 103 may determine the above plural frequency domain resources corresponding to the same time domain resource in the monitoring duration T (see (2) mentioned above). Alternatively, the control unit 103 may determine plural frequency domain resources corresponding to different time domain resources in the monitoring duration T (see (3) mentioned above, for example, FIG. 21).

Further, when the (i+1)th-time decoding of the PDCCH (where $0 \leq i < R-1$) by the receiving unit 101 is successful, the control unit 103 may stop monitoring of the PDCCH for the (i+2)th time and after. For example, when the (i+1)th-time decoding of the PDCCH in a slot #$k_i$ is successful, the control unit 103 may stop monitoring of a repetitive search space provided in a slot #$k_{i+1}$ and after, or may continue the monitoring as many times as the repetition number R. Similarly, when the (i+1)th-time decoding of the PDCCH in a frequency resource #i is successful, the control unit 103 may stop monitoring of a repetitive search space provided in a frequency resource #i+1 and after, or may continue the monitoring as many times as the repetition number R.

Further, the control unit 103 may control switching of search space groups based on a given field value in the DCI. Based on the given field value, the control unit 103 may determine the repetition number R of the PDCCH monitored using a search space associated with the search space group concerned (see (4) mentioned above).

Further, based on the maximum value of the PDCCH repetition number R and the given field value in the DCI, the control unit 103 may determine the repetition number R of the PDCCH monitored by using a search space associated with the search space group after being switched to (for example, FIG. 24).

Further, when controlling switching of search space groups based on the given field value in the DCI, the control unit 103 may determine a repetition number of a PDSCH or a PUSCH scheduled by the DCI.

Base Station

Figure 27:
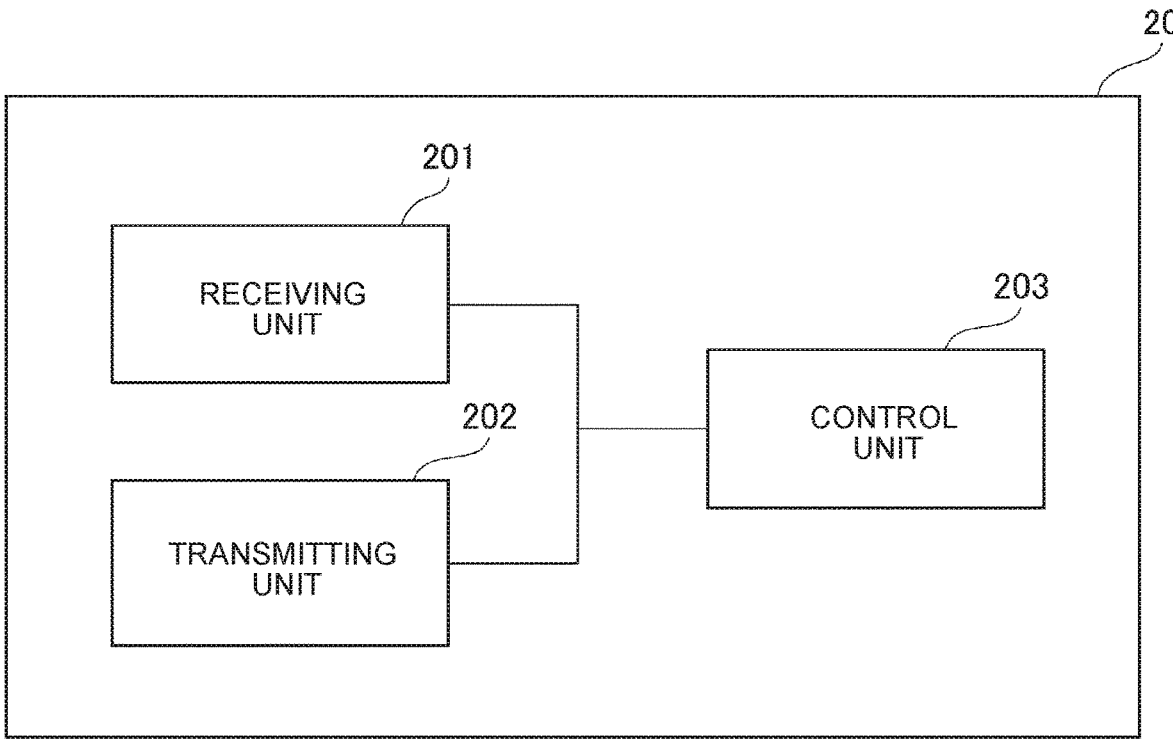
FIG. 27 is a diagram illustrating an example of the functional block configuration of a base station according to the present embodiment.

FIG. 27 is a diagram illustrating an example of the functional block configuration of the base station according to the present embodiment. As illustrated in FIG. 27, the base station 20 includes a receiving unit 201, a transmitting unit 202, and a control unit 203.

Note that all or some of the functions implemented by the receiving unit 201 and the transmitting unit 202 can be realized by using the communication device 13. Further, all or some of the functions implemented by the receiving unit 201 and the transmitting unit 202, and the function of the control unit 203 can be realized by the processor 11 executing a program stored in the storage device 12. Further, the program can be stored on a storage medium. The storage medium with the program stored thereon may be a non-transitory computer readable medium. The non-transitory storage medium is not particularly limited but may be a storage medium such as a USB memory or a CD-ROM.

The receiving unit 201 receives the above-mentioned unlink signals. The receiving unit 201 may also receive information and/or data transmitted through each of the above-mentioned unlink signals.

The transmitting unit 202 transmits the above-mentioned downlink signals. The transmitting unit 202 may also transmit information and/or data to be transmitted through each of the above-mentioned downlink signals.

Further, the transmitting unit 202 transmits DCI. Specifically, the transmitting unit 202 may transmit the DCI through a PDCCH. The transmitting unit 202 may also transmit the PDSCH scheduled by the DCI.

Further, the transmitting unit 202 may transmit DCI including a given field value used for switching of search space groups (for example, FIG. 23). The given field value may indicate information on a repetition number of a downlink control channel monitored by using a search space associated with the search space group concerned. The given field value may also indicate information on a repetition number of a downlink shared channel or an uplink shared channel scheduled by the uplink control information.

The transmitting unit 202 may also transmit search space information (for example, FIG. 9 and FIG. 19) related to a search space associated with a control resource set (CORE-SET). Further, the receiving unit 101 may transmit CORE-SET information (for example, FIGS. 12, 14, and 16) related to one or more CORESETs associated with the search space. Further, the transmitting unit 202 may transmit the above PDCCH information (for example, FIG. 20). Further, the transmitting unit 202 may transmit information indicative of the maximum value of the repetition number R (for example, FIG. 24).

The control unit 203 performs various controls on the base station 20. Specifically, based on the above search space information and/or the above CORESET information, the control unit 203 may control transmission of a downlink control channel using a search space in a given-cycle monitoring duration T.

Based on repetition information related to the repetition of each PDCCH included in the above search space information, the control unit 203 may control repeated transmission of the PDCCH between different slots and/or in the same slot inside the monitoring duration T (see (1) mentioned above).

Here, the above repetition information may also include information indicative of the PDCCH repetition number R. The control unit 203 may determine the above-mentioned different slots based on the repetition number R (for example, FIGS. 4 to 6, and 9).

Further, the above repetition information may include information indicative of the maximum value of the PDCCH repetition number R. Based on the maximum value and the repetition number R determined based on the given value in the DCI, the control unit 203 may determine the above different slots (for example, FIGS. 4 to 6, and 10).

Further, the above repetition information may include information indicative of a repetition start slot #$k_0$ of the PDCCH. The control unit 203 may determine the different slots based on the start slot #$k_0$ (for example, FIGS. 4 to 8).

Note that the above-mentioned different slots may be plural slots in one monitoring duration T among given-cycle monitoring durations T (for example, FIG. 4), or may be plural slots that span across two or more durations among the given-cycle monitoring durations T (for example, FIG. 5 and FIG. 6).

Further, the above repetition information may include repetitive symbol information indicative of symbols in which the PDCCH is repeated. Based on the repetitive symbol information and monitoring symbol information indicative of symbols for monitoring the PDCCH, the control unit 203 may determine plural symbols for repeatedly transmitting the PDCCH in the same slot mentioned above (for example, FIG. 7 and FIG. 8).

The control unit 203 may control repeated transmission of the PDCCH using the same frequency domain resource between the above-mentioned different slots and/or in the above-mentioned same slot (see (1) mentioned above). Further, the control unit 203 may control repeated transmission of the PDCCH using different frequency domain resources between the above-mentioned different slots and/or in the same slot (see (3) mentioned above).

The control unit 203 may also control repeated transmission of the PDCCH between plural frequency domain resources corresponding to the one or more CORESETs mentioned above (see (2) mentioned above).

Here, the search space may be associated with a single CORESET, and the above plural frequency domain resources may correspond to the single CORESET (see (2.1) mentioned above).

CORESET information for the single CORESET may also include plural pieces of frequency domain resource information respectively indicative of the above plural frequency domain resources. The control unit 203 may determine the above plural frequency domain resources based on the plural pieces of frequency domain resource information mentioned above (for example, FIG. 11 and FIG. 12).

Further, the CORESET information for the single CORESET may include frequency domain resource information indicative of one of the above frequency domain resources, and repetition number information indicative of the repetition number R of the PDCCH. Based on the frequency domain resource information and the repetition number information, the control unit 203 may determine the plural frequency domain resources mentioned above (for example, FIG. 13 and FIG. 14).

Further, the CORESET information for the single CORESET may include frequency domain resource information indicative of one of the above plural frequency domain resources, and offset information indicative of an offset for any other frequency domain resource among the plural frequency domain resources. The control unit 203 may determine the above plural frequency domain resources based on the frequency domain resource information and the offset information (for example, FIGS. 15 to 17).

Further, the search space may be associated with plural CORESETs, and the above plural frequency domain resources may correspond to the plural CORESETs, respectively (see (2.2) mentioned above).

Based on plural pieces of CORESET information respectively related to the plural CORESETs, the control unit 203 may determine the above plural frequency domain resources (for example, FIGS. 18 to 20).

The control unit 203 may determine a given-cycle monitoring duration T for repeatedly transmitting the PDCCH using the search space based on the above search space information. Further, the control unit 203 may determine the above plural frequency domain resources corresponding to the same time domain resource in the monitoring duration T (see (1) mentioned above). Alternatively, the control unit 203 may determine plural frequency domain resources corresponding to different time domain resources in the monitoring duration T (see (3) mentioned above).

Further, the control unit 203 may control switching of search space groups (see (4) mentioned above).

Operation of Wireless Communication System

Next, the operation of the wireless communication system 1 configured as described above will be described. Note that FIG. 28 and FIG. 29 are just illustrative examples, and it may of course be possible that some steps are omitted or unillustrated steps are performed.

Figure 28:
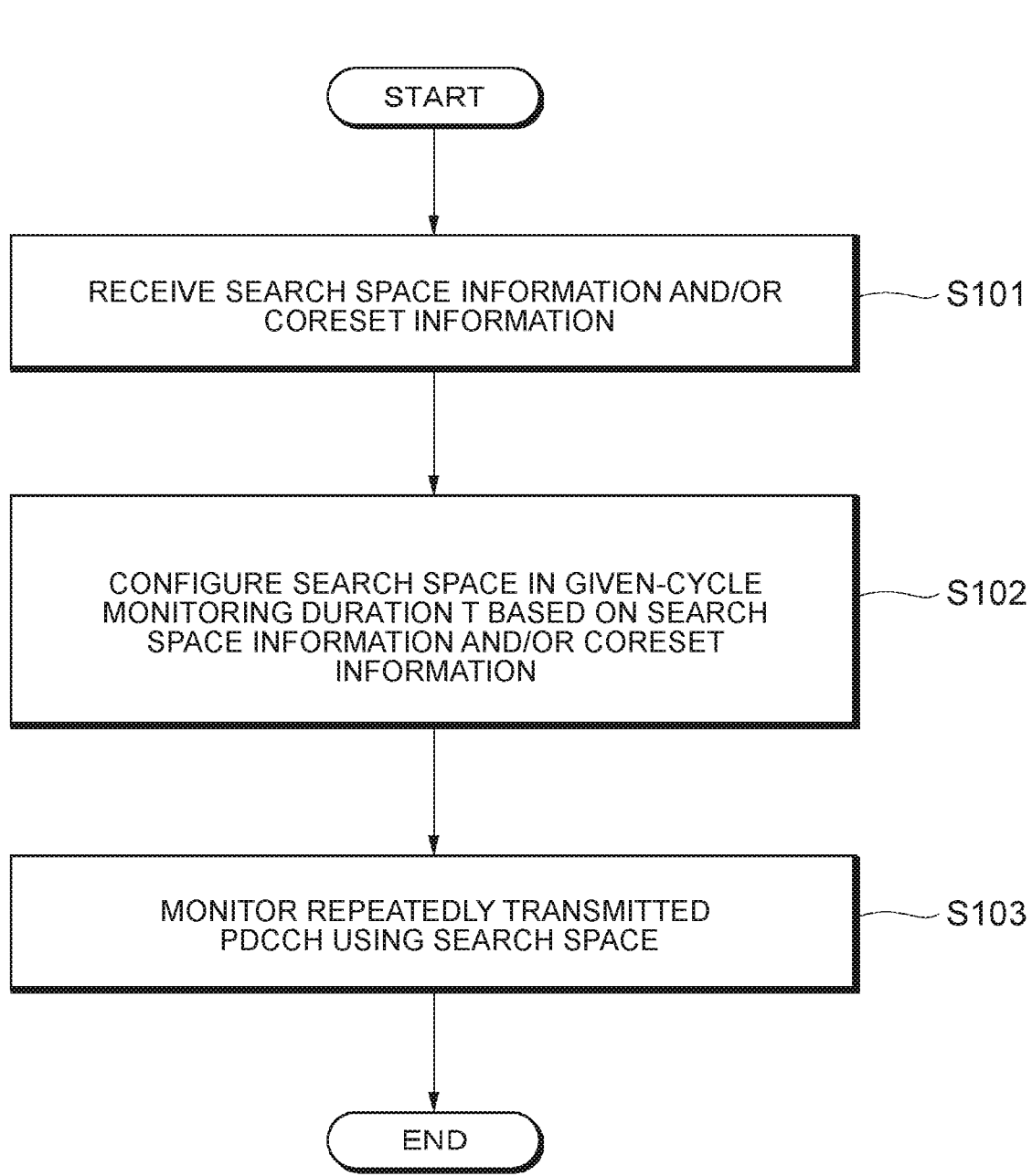
FIG. 28 is a flowchart illustrating operation of PDCCH monitoring in the wireless communication system according to the present embodiment.
Figure 29:
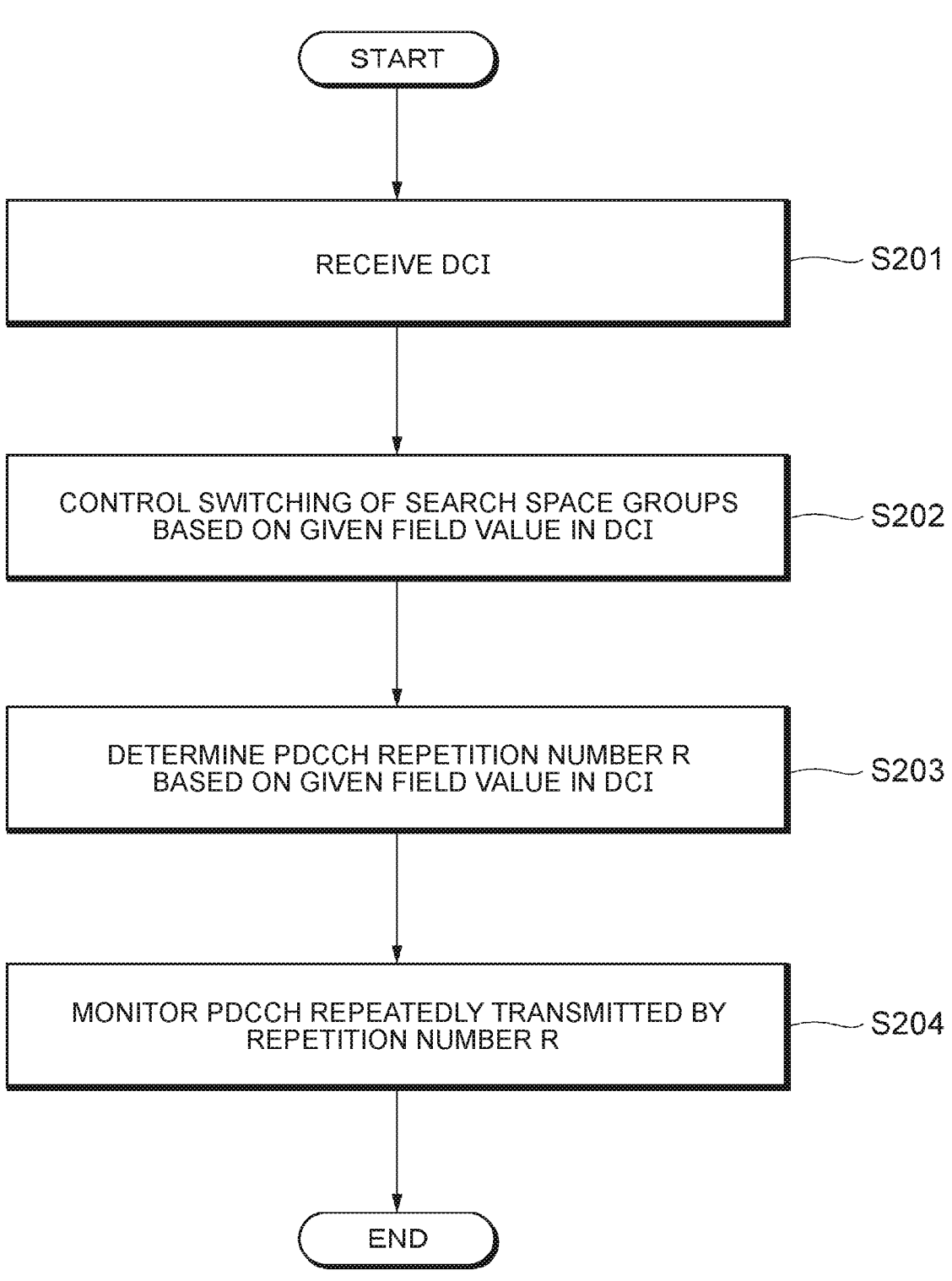
FIG. 29 is a flowchart illustrating an example of operation of switching of search space groups in the wireless communication system according to the present embodiment.

FIG. 28 is a flowchart illustrating an example of operation of PDCCH monitoring in the wireless communication system according to the present embodiment. As illustrated in FIG. 28, the terminal 10 receives one or more pieces of search space information and/or one or more pieces of CORESET information in step S101. The search space information and/or the CORESET information may be included, for example, in an RRC reconfiguration message, but it is not limited thereto.

In step S102, the terminal 10 configures a search space for monitoring a PDCCH repeatedly transmitted in a given-cycle monitoring duration T based on the search space information and/or the CORESET information.

In step S103, the terminal 10 uses the search space configured in step S102 to monitor the PDCCH repeatedly transmitted using different time domain resources and/or different frequency domain resources (see (1) to (3) mentioned above).

As described above, according to the wireless communication system 1 of the present embodiment, monitoring of the PDCCH repeatedly transmitted using the different time domain resources and/or the different frequency domain resources can be controlled properly.

FIG. 29 is a flowchart illustrating an example of operation of switching search space groups in the wireless communication system according to the present embodiment. As illustrated in FIG. 29, the terminal 10 receives DCI in step S201.

In step S202, the terminal 10 controls switching of search space groups based on a given field value in the DCI received in step S201. Specifically, the terminal 10 may switch a search space group used for monitoring of the PDCCH to another search space group indicated by the given field value.

In step S203, based on the given field value in the DCI received in step S201, the terminal 10 may determine a repetition number R of the PDCCH monitored in a search space associated with the search space group to switch to in step S202.

In step S204, the terminal 10 uses the search space to monitor the PDCCH repeatedly transmitted by the repetition number R determined in step S203 (see (1) to (3) mentioned above).

OTHER EMBODIMENTS

Various signals, information, and parameters in the aforementioned embodiment may be signaled in any layer. In other words, the various signals, information, and parameters mentioned above may be replaced with signals, information, and parameters in any layer such as an upper layer (for example, a Non Access Stratum (NAS) layer, an RRC layer, or a MAC layer), a lower layer (for example, a physical layer), or the like. Further, the notification of the given information is not limited to explicit notification, which may also be implicit notification (for example, by not notifying the information or using any other information).

Further, the names of various signals, information, parameters, IE, channels, time units, and frequency units are just illustrative examples in the aforementioned embodiment, and the names may be replaced with other names. For example, the slot may be any other name as long as it is a time unit having a given number of symbols. Further, RB may be any other name as long as it is a frequency unit having a given number of subcarriers.

Further, the applications of the terminal 10 in the aforementioned embodiment (for example, for RedCap, IoT, and the like) are not limited to those exemplified, and the terminal 10 may also be used for any other purpose (for example, for eMBB, URLLC, or Device-to-Device (D2D), Vehicle-to-Everything (V2X), or the like) as long as it has similar functions. Further, the format of various information is not limited to that in the aforementioned embodiment, and it may be changed accordingly such as to bit representation (0 or 1), Boolean (true or false), Integer values, or characters. Further, the singular and the plural in the aforementioned embodiment may be mutually changed.

The embodiment described above is to facilitate the understanding of this disclosure, and it is not intended to limit the interpretation of this disclosure. The flowchart or the sequence described in the embodiment, and the alignment and arrangement of respective elements, indexes, conditions, and the like included in the embodiment are not limited to those exemplified, and can be changed accordingly. Further, at least some of components described in the aforementioned embodiment can be partially replaced or combined.

What is claimed is:

1. A terminal comprising:

control circuitry configured to control monitoring of a physical downlink control channel (PDCCH) in a first search space and a second search space configured in a time domain; and receiving circuitry configured to receive: first information indicative of symbols for monitoring the PDCCH in a slot; second information indicative of a periodicity of slots for monitoring the PDCCH, a duration in which a search space exists, and a number of PDCCH candidates per control channel element (CCE) aggregation level; third information for identifying the first search space and second search space; and fourth information indicating that the first search space and the second search space are associated;

wherein:

the periodicity of slots, the duration in which the search space exists, and the number of PDCCH candidates per CCE aggregation level are the same for the first search space and the second search space; and the control circuitry is further configured to:

determine the first search space and the second search space based on the third information;

determine that the first search space and the second search space are associated based on the fourth information;

determine the symbols for monitoring repeated PDCCHs based on the first information; and monitor the PDCCH in the first search space and the second search space based on the second information.

2. The terminal according to claim 1, wherein:

the receiving circuitry is configured to receive a radio resource control reconfiguration message including the first information, the second information, the third information and the fourth information.

3. The terminal according to claim 2, wherein:

the first information, the second information, the third information, and the fourth information are configured respectively for one or more bandwidth parts (BWPs).

4. A base station comprising:

control circuitry configured to control transmission of a physical downlink control channel (PDCCH) in a first search space and a second search space configured in a time domain; and transmitting circuitry configured to transmit: first information indicative of symbols for monitoring the PDCCH in a slot; second information indicative of a periodicity of slots for monitoring the PDCCH, a duration in which a search space exists, and a number of PDCCH candidates per control channel element (CCE) aggregation level; third information for identifying the first search space and the second search space; and fourth information indicating that the first search space and the second search space are associated;

wherein:

the periodicity of slots, the duration in which the search space exists, and the number of PDCCH candidates per CCE aggregation level are the same for the first search space and the second search space; and the control circuitry is further configured to:

associate the first search space and the second search space based on the fourth information;

transmit the PDCCH repeatedly in the first search space and the second search space based on the second information; and control the transmission of the repeated PDCCHs based on the first information.

5. The base station according to claim 4, wherein:

the transmitting circuitry is configured to transmit a radio resource control reconfiguration message including the first information, the second information, the third information, and the fourth information.

6. The base station according to claim 5, wherein:

the first information, the second information, the third information, and the fourth information are configured respectively for one or more bandwidth parts (BWPs).

7. A wireless communication method for a terminal, comprising:

controlling monitoring of a physical downlink control channel PDCCH) in a first search space and a second search space configured in a time domain; and receiving: first information indicative of symbols for monitoring the PDCCH in a slot; second information indicative of a periodicity of slots for monitoring the PDCCH, a duration in which a search space exists, and a number of PDCCH candidates per control channel element (CCE) aggregation level; third information for identifying the first search space and the second search space; and fourth information indicating that the first search space and the second search space are associated determining the first search space and the second search space based on the third information;

determining the symbols for monitoring repeated PDCCHs based on the first information; and monitoring the PDCCH in the first search space and the second search space based on the second information;

wherein the periodicity of slots, the duration in which the search space exists, and the number of PDCCH candidates per CCE aggregation level are the same for the first search space and the second search space.

8. The wireless communication method according to claim 7, wherein:

the receiving includes receiving a radio resource control reconfiguration message including the first information, the second information, the third information, and the fourth information.

9. The wireless communication method according to claim 8, wherein:

the first information, the second information, the third information, and the fourth information are configured respectively for one or more bandwidth parts (BWPs).

10. A wireless communication method for a base station, comprising:

controlling transmission of a physical downlink control channel (PDCCH) in a first search space and a second search space configured in a time domain;

transmitting: first information indicative of symbols for monitoring the PDCCH in a slot; second information indicative of a periodicity of slots for monitoring the PDCCH, a duration in which a search space exists, and a number of PDCCH candidates per control channel element (CCE) aggregation level; third information for identifying the first search space and the second search space; and fourth information indicating that the first search space and the second search space are associated;

associating the first search space and the second search space based on the fourth information;

transmitting the PDCCH repeatedly in the first search space and the second search space based on the second information; and controlling the transmission of the repeated PDCCHs based on the first information;

wherein the periodicity of slots, the duration in which the search space exists, and the number of PDCCH candidates per CCE aggregation level are the same for the first search space and the second search space.

11. The wireless communication method according to claim 10, wherein:

the transmitting includes transmitting a radio resource control reconfiguration message including the first information, the second information, the third information, and the fourth information.

12. The wireless communication method according to claim 11, wherein:

the first information, the second information, the third information, and the fourth information are configured respectively for one or more bandwidth parts (BWPs).

\* \* \* \* \*